(12) United States Patent  (10) Patent No.: US 8,814,341 B2
Nagao et al.  (45) Date of Patent: Aug. 26, 2014

(54) INK, INK CARTRIDGE AND INK JET RECORDING METHOD

(71) Applicant: Canon Kabushiki Kaisha, Tokyo (JP)

(72) Inventors: Ryosuke Nagao, Kawasaki (JP); Jun Yoshizawa, Tokyo (JP); Hideki Yamakami, Yokohama (JP); Kuniaki Fujimoto, Chofu (JP); Yukako Tamanuki, Tokyo (JP); Otome Yamashita, Yokohama (JP); Minako Kawabe, Koganei (JP); Junichi Sakai, Machida (JP); Satoshi Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/891,676

(22) Filed: May 10, 2013

(65) Prior Publication Data

US 2013/0335490 A1  Dec. 19, 2013

(30) Foreign Application Priority Data

Jun. 15, 2012  (JP) .................................. 2012-136343

(51) Int. Cl.
 *G01D 11/00* (2006.01)
 *C09D 11/00* (2014.01)

(52) U.S. Cl.
 USPC ........................................ 347/100; 106/31.13

(58) Field of Classification Search
 USPC .............. 347/100; 106/31.13, 31.45; 523/160
 See application file for complete search history.

(56) References Cited

U.S. PATENT DOCUMENTS 6,265,146 B1 * 7/2001 Kashiwagi .................... 430/584
6,966,944 B2  11/2005 Shimomura et al.

(Continued)

FOREIGN PATENT DOCUMENTS

CN  1831054 A  9/2006
CN  1961049 A  5/2007

(Continued)

OTHER PUBLICATIONS

Sep. 6, 2013 European Search Report in European Patent Appln. No. 13002552.1.

(Continued)

*Primary Examiner* — Anh T. N. Vo
(74) *Attorney, Agent, or Firm* — Fitzpatrick, Cella, Harper & Scinto

(57) ABSTRACT

Provided is an ink capable of recording an image that is excellent in ozone resistance, hardly causes blurring or color change even in a high-humidity environment, and is excellent in humidity resistance. The ink includes a coloring material and a lithium ion. The coloring material includes a compound represented by the following general formula (I) and a content of the lithium ion in the ink is 3.5 times or more in terms of molar ratio with respect to a content of the compound represented by the general formula (I).

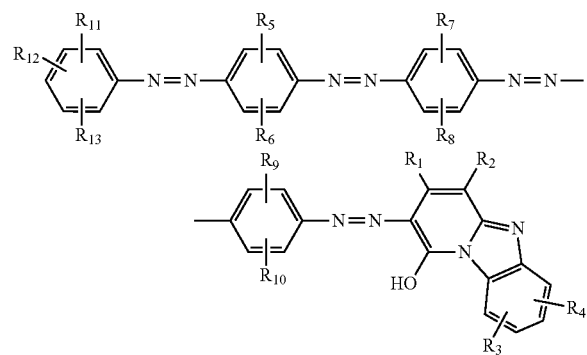

8 Claims, 2 Drawing Sheets

(56) References Cited

U.S. PATENT DOCUMENTS

| | | | |
|---|---|---|---|
| 7,008,977 B2 | 3/2006 | Sakai et al. | |
| 7,083,908 B2 * | 8/2006 | Yamamoto et al. | 430/619 |
| 7,144,452 B2 | 12/2006 | Takayama et al. | |
| 7,160,372 B2 | 1/2007 | Yoshizawa et al. | |
| 7,208,033 B2 | 4/2007 | Kawabe et al. | |
| 7,226,498 B2 | 6/2007 | Yamashita et al. | |
| 7,241,332 B2 | 7/2007 | Yoshizawa et al. | |
| 7,244,299 B2 | 7/2007 | Tsuji et al. | |
| 7,247,194 B2 | 7/2007 | Okamura et al. | |
| 7,247,196 B2 | 7/2007 | Sato et al. | |
| 7,270,701 B2 | 9/2007 | Jinnou et al. | |
| 7,279,034 B2 | 10/2007 | Oki et al. | |
| 7,285,159 B2 | 10/2007 | Aikawa et al. | |
| 7,291,211 B2 | 11/2007 | Kaneko et al. | |
| 7,294,184 B2 | 11/2007 | Fujimoto et al. | |
| 7,297,194 B2 | 11/2007 | Shinjo et al. | |
| 7,297,197 B2 | 11/2007 | Jinnou et al. | |
| 7,297,202 B2 | 11/2007 | Ichinose et al. | |
| 7,364,770 B2 | 4/2008 | Nagashima et al. | |
| 7,377,631 B2 | 5/2008 | Takada et al. | |
| 7,431,760 B2 | 10/2008 | Chino et al. | |
| 7,445,325 B2 | 11/2008 | Aikawa et al. | |
| 7,445,666 B2 | 11/2008 | Yanagimachi et al. | |
| 7,504,488 B2 | 3/2009 | Toyoda et al. | |
| 7,537,651 B2 * | 5/2009 | Park et al. | 106/31.51 |
| 7,550,037 B2 | 6/2009 | Mafune et al. | |
| 7,553,358 B2 | 6/2009 | Okamura et al. | |
| 7,566,362 B2 | 7/2009 | Mori et al. | |
| 7,594,719 B2 | 9/2009 | Tomioka et al. | |
| 7,611,571 B2 | 11/2009 | Yamashita et al. | |
| 7,618,484 B2 | 11/2009 | Fujimoto et al. | |
| 7,637,603 B2 | 12/2009 | Kawabe et al. | |
| 7,682,433 B2 | 3/2010 | Yanagimachi et al. | |
| 7,866,809 B2 | 1/2011 | Tomioka et al. | |
| 7,868,060 B2 | 1/2011 | Sakai et al. | |
| 7,887,627 B2 | 2/2011 | Rengaswamy et al. | |
| 7,988,277 B2 | 8/2011 | Moribe et al. | |
| 8,025,722 B2 | 9/2011 | Kawabe et al. | |
| 8,029,612 B2 | 10/2011 | Ishii et al. | |
| 8,038,780 B2 | 10/2011 | Tateishi et al. | |
| 8,070,868 B2 * | 12/2011 | Tateishi | 106/31.5 |
| 8,070,871 B2 | 12/2011 | Kawabe et al. | |
| 8,075,126 B2 | 12/2011 | Yoshizawa et al. | |
| 8,083,341 B2 | 12/2011 | Yamakami et al. | |
| 8,114,208 B2 | 2/2012 | Nakata et al. | |
| 8,123,846 B2 | 2/2012 | Yamakami et al. | |
| 8,343,269 B2 | 1/2013 | Takahashi et al. | |
| 8,372,190 B2 | 2/2013 | Tateishi et al. | |
| 8,393,726 B2 | 3/2013 | Moribe et al. | |
| 2004/0174420 A1 | 9/2004 | Kitamura et al. | |
| 2008/0092770 A1 | 4/2008 | Park et al. | |
| 2009/0148602 A1 | 6/2009 | Tojo | |
| 2010/0075040 A1 | 3/2010 | Tateishi et al. | |
| 2011/0141186 A1 | 6/2011 | Kawabe et al. | |
| 2011/0310162 A1 | 12/2011 | Tamanuki et al. | |
| 2012/0147083 A1 | 6/2012 | Hayashi et al. | |

FOREIGN PATENT DOCUMENTS

| | | |
|---|---|---|
| CN | 100999629 A | 7/2007 |
| CN | 101663365 A | 3/2010 |
| CN | 101842449 A | 9/2010 |
| EP | 2 653 505 A1 | 10/2013 |
| JP | 2002-332426 A | 11/2002 |
| JP | 2003-206421 A | 7/2003 |
| JP | 2005-139427 A | 6/2005 |
| JP | 2005-307068 A | 11/2005 |
| JP | 2008-088346 A | 4/2008 |
| JP | 2008-169374 A | 7/2008 |
| JP | 2012-046559 A | 3/2012 |
| WO | 2012/081637 A1 | 6/2012 |
| WO | 2012/081638 A1 | 6/2012 |
| WO | 2012/081640 A1 | 6/2012 |

OTHER PUBLICATIONS

XP-002711859, Data Base WPI Week 201252 Thomson Scientific, London, GB; AN 2012-H03243, pp. 1-5 (corresponding to WO 2012/081640 A1), Jun. 21, 2012.

XP-002711861, Data Base WPI Week 201249 Thomson Scientific, London, GB; AN 2012-H03095, pp. 1-4 (corresponding to WO 2012/081638 A1), Jun. 21, 2012.

XP-002711862, Data Base WPI Week 200581 Thomson Scientific, London, GB; AN 2005-789666, pp. 1-5 (corresponding to JP 2005-307068 A), Nov. 4, 2005.

XP-002711863, Data Base WPI Week 201223 Thomson Scientific, London, GB; AN 2012-C88692, pp. 1-3 (corresponding to JP 2012-046559 A), Mar. 8, 2012.

XP-002711860, Data Base WPI Week 201251 Thomson Scientific, London, GB; AN 2012-H03078, pp. 1-4 (corresponding to WO 2012/081637 A1), Jun. 21, 2012.

European Search Report dated Apr. 7, 2014, in European Appln. No. 13002552.1.

Chinese Office Action dated Jun. 24, 2014, issued in counterpart Chinese Application No. 201310234848.6, and English-language translation thereof.

* cited by examiner

INK, INK CARTRIDGE AND INK JET RECORDING METHOD

BACKGROUND OF THE INVENTION

1. Field of the Invention

The present invention relates to an ink, an ink cartridge and an ink jet recording method.

2. Description of the Related Art

An ink jet recording method is such a recording method that minute droplets of an ink are applied to a recording medium such as plain paper to form an image, and is rapidly spread owing to low price of an apparatus itself and improvement of recording speed. In general, a recorded article obtained by the ink jet recording method is low in fastness properties of an image thereof compared with a silver salt photograph. In particular, when the recorded article is exposed to light, humidity, heat or environmental gas present in air, such as an ozone gas for a long period of time, there is a problem that a coloring material of the recorded article is deteriorated to easily cause change in color tone or fading of the image.

In the ink jet recording method, inks each having, for example, a yellow, magenta, cyan, or black hue are used. It has heretofore been acknowledged that the ink having a black hue out of those inks needs to be improved in terms of its performance such as ozone resistance, and various proposals have been made on the improvement. For example, there has been a proposal on an ink containing an azo dye, in which the number of conjugated n-electrons of an aromatic ring that is not directly bonded to an azo group is specified, for improving the ozone resistance of an image to be recorded (see Japanese Patent Application Laid-Open No. 2005-139427). In addition, there has been a proposal on an ink using a polyazo compound (see Japanese Patent Application Laid-Open Nos. 2008-169374, 2012-046559, and 2002-332426). Japanese Patent Application Laid-Open No. 2002-332426 describes that with such ink, the humidity resistance of an image to be recorded improves.

Meanwhile, there has been a proposal on an ink containing a coloring material having a carboxy group and an alkali metal ion for improving ink jet characteristics such as recoverability from fixation (see Japanese Patent Application Laid-Open No. 2003-206421).

SUMMARY OF THE INVENTION

In recent years, the levels of characteristics required for an image to be recorded by the ink jet recording method have been rising, and hence various investigations have heretofore been conducted on the characteristics. However, the ozone resistance of an image recorded with the ink containing a dye described in each of Japanese Patent Application Laid-Open Nos. 2005-139427, 2008-169374, 2012-046559, and 2002-332426 has not reached a level required in recent years. In addition, Japanese Patent Application Laid-Open No. 2003-206421 describes that the ink improves the humidity resistance of an image, but the degrees of the blurring and color change of the image have not satisfied levels required in recent years.

Therefore, an object of the present invention is to provide an ink capable of recording an image that is excellent in ozone resistance, hardly causes blurring or color change even in a high-humidity environment, and is excellent in humidity resistance. Another object of the present invention is to provide an ink cartridge and an ink jet recording method each using the ink.

The objects are achieved by the present invention described below. That is, according to the present invention, there is provided an ink, including a coloring material and a lithium ion, in which: the coloring material includes a compound represented by the following general formula (I); and a content of the lithium ion in the ink is 3.5 times or more in terms of molar ratio with respect to a content of the compound represented by the general formula (I):

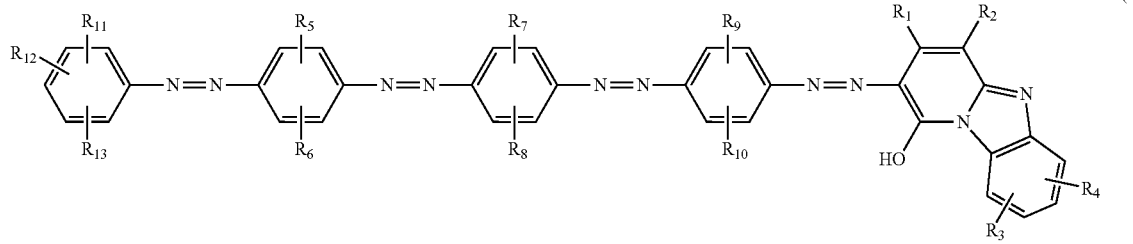

(I)

in the general formula (I), $R_1$ represents an alkyl group having 1 to 4 carbon atoms; an alkyl group having 1 to 4 carbon atoms and being substituted with a carboxy group; a phenyl group; a phenyl group substituted with a sulfonic group; or a carboxy group, $R_2$ represents a cyano group; a carbamoyl group; or a carboxy group, $R_3$ and $R_4$ each independently represent a hydrogen atom; an alkyl group having 1 to 4 carbon atoms; a halogen atom; an alkoxy group having 1 to 4 carbon atoms; or a sulfonic group, $R_5$ and $R_7$ each independently represent an alkylthio group having 1 to 4 carbon atoms; or an alkylthio group having 1 to 4 carbon atoms and being substituted with at least one kind of group selected from the group consisting of a hydroxy group, a sulfonic group, and a carboxy group, $R_6$ and $R_8$ each independently represent an alkylcarbonylamino group having 1 to 4 carbon atoms, $R_9$ and $R_{10}$ each independently represent a hydrogen atom; a carboxy group; a sulfonic group; an acetylamino group; a halogen atom; an alkyl group having 1 to 4 carbon atoms; an alkoxy group having 1 to 4 carbon atoms; or an alkoxy group having 1 to 4 carbon atoms and being substituted with at least one kind of group selected from the group consisting of a hydroxy group, an alkoxy group having 1 to 4 carbon atoms, a sulfonic group, and a carboxy group, and $R_{11}$, $R_{12}$, and $R_{13}$ each independently represent a hydrogen atom; a carboxy group; a sulfonic group; a hydroxy group; an acetylamino group; a halogen atom; a cyano group; a nitro group; a sulfamoyl group; an alkyl group having 1 to 4 carbon atoms; an alkoxy group having 1 to 4 carbon atoms; an alkoxy group having 1 to 4 carbon atoms and being substituted with at least one kind of group selected from the group consisting of a hydroxy group, an alkoxy group having 1 to 4 carbon atoms; a sulfonic group, and a carboxy group; an alkylsulfonyl group having 1 to 4 carbon atoms; or an alkylsulfonyl group having 1 to 4 carbon atoms and being substituted with at least one kind of group selected from the group consisting of a hydroxy group, a sulfonic group, and a carboxy group.

According to the present invention, it is possible to provide an ink capable of recording an image that is excellent in ozone resistance, hardly causes blurring or color change even in a high-humidity environment, and is excellent in humidity resistance. According to the present invention, it is also possible to provide an ink cartridge and an ink jet recording method each using the ink.

Further features of the present invention will become apparent from the following description of exemplary embodiments with reference to the attached drawings.

BRIEF DESCRIPTION OF THE DRAWINGS

FIGS. 2A and 2B schematically illustrate an exemplary ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Figure 1:
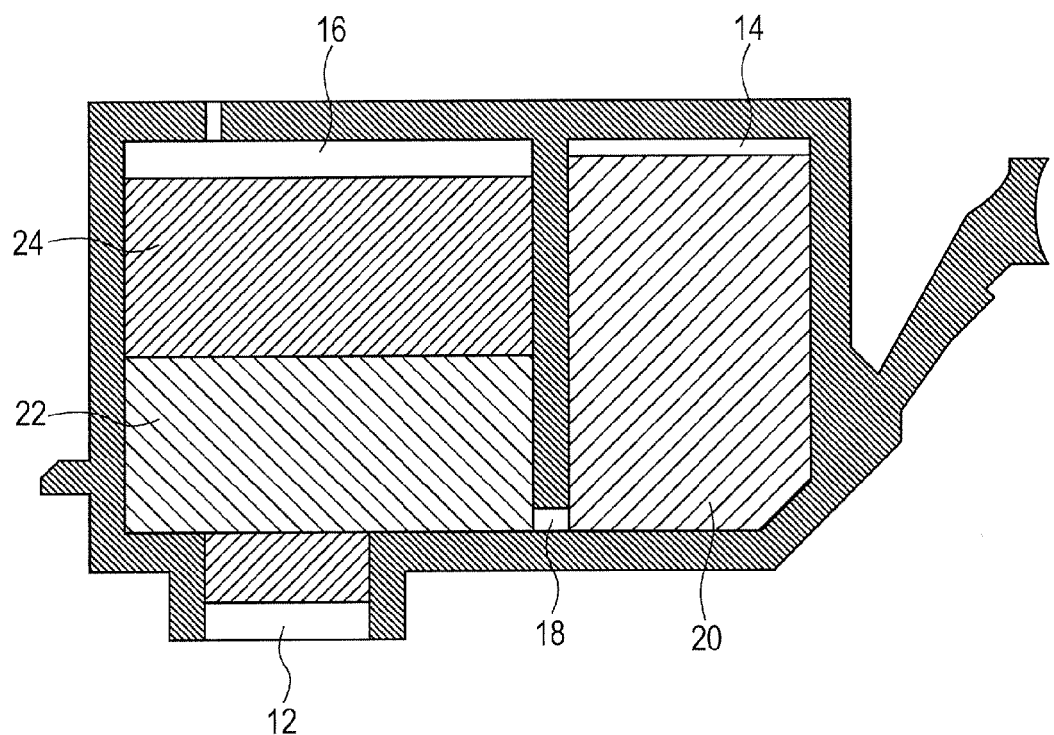
FIG. 1 is a sectional view schematically illustrating an ink cartridge according to an embodiment of the present invention.

Preferred embodiments of the present invention will now be described in detail in accordance with the accompanying drawings. Incidentally, when a compound is a salt, the salt present in an ink in a state of being dissociated into ions. In the present invention, however, this is referred to as "containing a salt" for the sake of convenience.

A reduction in humidity resistance of an image occurs as described below. In a high-humidity environment, a recording medium absorbs moisture in the air and a coloring material that has dissolved in the moisture moves in the recording medium to cause the reduction. In view of the foregoing, the inventors of the present invention have conducted an investigation on a cause for the reduction of the humidity resistance by paying attention to the presence state of the coloring material in the recording medium. As a result, the inventors have found that a principal cause for the reduction of the humidity resistance of the image is the presence of the coloring material in the recording medium in such a state that multiple coloring material molecules agglomerate without adsorbing or binding to the recording medium. Therefore, the inventors have found that causing the coloring material present in the recording medium to be present in such a state that a cationic component (alumina or a hydrate thereof, a cationic resin, or a loading material) in the recording medium strongly adsorbs the coloring material leads to the suppression of blurring and color change.

In view of the foregoing, the inventors of the present invention have conducted an additional investigation by paying attention to the associated state of the coloring material before its permeation into the recording medium for causing the cationic component in the recording medium to adsorb the coloring material earlier than the agglomeration of the multiple coloring material molecules in the recording medium. In addition, the inventors have considered that bringing the state of the coloring material in an ink not into a state where the multiple coloring material molecules associate with each other but into such a state that the molecules are present as independently as possible is effective for the purpose.

A compound represented by the general formula (I) to be described later is a coloring material capable of recording an image having good fastness properties, in particular, good ozone resistance by virtue of its molecular structure. The compound represented by the general formula (I) may be present in an associated state even in the ink because the compound has such a characteristic as to easily agglomerate. In addition, the compound represented by the general formula (I) has high agglomeration property. Accordingly, as is understood from the foregoing description, the compound has low humidity resistance.

As a result of further investigation, the inventors of the present invention have found that when the compound represented by the general formula (I) as a coloring material capable of recording an image having good ozone resistance is used, a reduction in humidity resistance can be suppressed by the following. That is, the inventors have found that it is sufficient that a lithium ion be incorporated into the ink and its content be set to 3.5 times or more in terms of molar ratio with respect to the content of the compound represented by the general formula (I).

The inventors of the present invention have assumed the reason why such effect is obtained to be as described below. When the lithium ion and other cations (such as a sodium ion or a potassium ion) are compared, an anionic group of the compound represented by the general formula (I) undergoes ionic dissociation more easily in the case where the lithium ion is present. In the ink in which the content of the lithium ion is set to 3.5 times or more in terms of molar ratio with respect to the content of the compound represented by the general formula (I), most of the anionic groups of the compound represented by the general formula (I) are brought into a state of being dissociated into ions. In such ink, strong electrostatic repulsion (negative charge) occurs between multiple coloring material molecules. Accordingly, the agglomeration of the multiple coloring material molecules hardly occurs and hence a state where the molecules are present independently is easily established. In addition, when the coloring material having the negative charge permeates the recording medium, the coloring material quickly interacts with the cationic component. Accordingly, the application of the ink to the recording medium causes the coloring material (compound represented by the general formula (I)) in the ink to quickly adsorb to the cationic component in the recording medium. As a result, even when the recording medium has absorbed moisture in the air, the dissolution of the coloring material is suppressed and hence the reduction of the humidity resistance of the image is suppressed.

<Ink>

Hereinafter, each component constituting an ink of the present invention suitable for ink jet recording is described in detail.

The ink of the present invention is capable of recording an image excellent in ozone resistance and having such a high level of humidity resistance that blurring or color change hardly occurs even when the image is left to stand in a high-humidity environment. In order to obtain such effect, the compound represented by the general formula (I) needs to be incorporated as a coloring material and the content of the lithium ion in the ink needs to be set to 3.5 times or more in terms of molar ratio with respect to the content of the compound represented by the general formula (I). The molar ratio is calculated from a ratio between the contents (moles) of the lithium ion and compound represented by the general formula (I) in the ink, the contents being determined as values per unit mass (or unit volume) of the ink. The content of the lithium ion in the ink can be measured by an ordinary method such as ion chromatography. In addition, the content of the compound represented by the general formula (I) in the ink can be measured by an ordinary method such as high performance liquid chromatography.

(Lithium Ion)

The inventors of the present invention have found that an ink showing the following effect is obtained when the content of the lithium ion in the ink is set to 3.5 times or more in terms of molar ratio with respect to the content of the compound represented by the general formula (I). That is, an ink capable of recording an image excellent in ozone resistance and having such a high level of humidity resistance that blurring or color change hardly occurs even when the image is left to stand in a high-humidity environment can be obtained.

The addition of, for example, a compound that produces the lithium ion through ionic dissociation to the ink suffices for the incorporation of the lithium ion into the ink. Examples of such compound can include an inorganic lithium salt and an organic lithium salt. For example, a lithium halide such as lithium fluoride, lithium chloride, or lithium bromide, a lithium salt of an inorganic acid such as lithium carbonate, lithium sulfate, lithium phosphate, lithium nitrate, or lithium borate, or lithium hydroxide has only to be added as the inorganic lithium salt to the ink, and for example, a lithium salt of an organic acid such as lithium acetate or lithium benzoate has only to be added as the organic lithium salt to the ink. In addition, the same effect can be obtained even when the compound represented by the general formula (I) or another coloring material containing the lithium ion as a counter ion is incorporated into the ink. The content (mol/g) of the lithium ion in the ink is preferably $1.0 \times 10^{-6}$ mol/g or more and $1.0 \times 10^{-3}$ mol/g or less. It should be noted that the value represents a content per 1 g of the ink.

The content of the lithium ion in the ink is preferably 30.0 times or less in terms of molar ratio with respect to the content of the compound represented by the general formula (I). When the content of the lithium ion is more than 30.0 times in terms of molar ratio with respect to the content of the compound represented by the general formula (I), reliability such as ejection stability is not obtained in some cases.

(Compound Represented by General Formula (I))

The ink of the present invention is required to contain the compound represented by the following general formula (I) as a coloring material.

In the general formula (I), $R_1$ represents an alkyl group having 1 to 4 carbon atoms; an alkyl group having 1 to 4 carbon atoms and being substituted with a carboxy group; a phenyl group; a phenyl group substituted with a sulfonic group; or a carboxy group. $R_2$ represents a cyano group; a carbamoyl group; or a carboxy group. $R_3$ and $R_4$ each independently represent a hydrogen atom; an alkyl group having 1 to 4 carbon atoms; a halogen atom; an alkoxy group having 1 to 4 carbon atoms; or a sulfonic group. $R_5$ and $R_7$ each independently represent an alkylthio group having 1 to 4 carbon atoms; or an alkylthio group having 1 to 4 carbon atoms and being substituted with at least one kind of group selected from the group consisting of a hydroxy group, a sulfonic group, and a carboxy group. $R_6$ and $R_8$ each independently represent an alkylcarbonylamino group having 1 to 4 carbon atoms. $R_9$ and $R_{10}$ each independently represent a hydrogen atom; a carboxy group; a sulfonic group; an acetylamino group; a halogen atom; an alkyl group having 1 to 4 carbon atoms; an alkoxy group having 1 to 4 carbon atoms; or an alkoxy group having 1 to 4 carbon atoms and being substituted with at least one kind of group selected from the group consisting of a hydroxy group, an alkoxy group having 1 to 4 carbon atoms, a sulfonic group, and a carboxy group. $R_{11}$, $R_{12}$, and $R_{13}$ each independently represent a hydrogen atom; a carboxy group; a sulfonic group; a hydroxy group; an acetylamino group; a halogen atom; a cyano group; a nitro group; a sulfamoyl group; an alkyl group having 1 to 4 carbon atoms; an alkoxy group having 1 to 4 carbon atoms; an alkoxy group having 1 to 4 carbon atoms and being substituted with at least one kind of group selected from the group consisting of a hydroxy group, an alkoxy group having 1 to 4 carbon atoms, a sulfonic group, and a carboxy group; an alkylsulfonyl group having 1 to 4 carbon atoms; or an alkylsulfonyl group having 1 to 4 carbon atoms and being substituted with at least one kind of group selected from the group consisting of a hydroxy group, a sulfonic group, and a carboxy group.

Tautomers exist for the compound represented by the general formula (I). Potential tautomers include compounds represented by, for example, the following general formulae (III) and (IV) in addition to the compound represented by the general formula (I). In the present invention, those compounds (tautomers) and salts are also included in the category of the compound represented by the general formula (I). It should be noted that $R_1$ to $R_{13}$ in the general formulae (III) and (IV) are identical in meaning to $R_1$ to $R_{13}$ in the general formula (I).

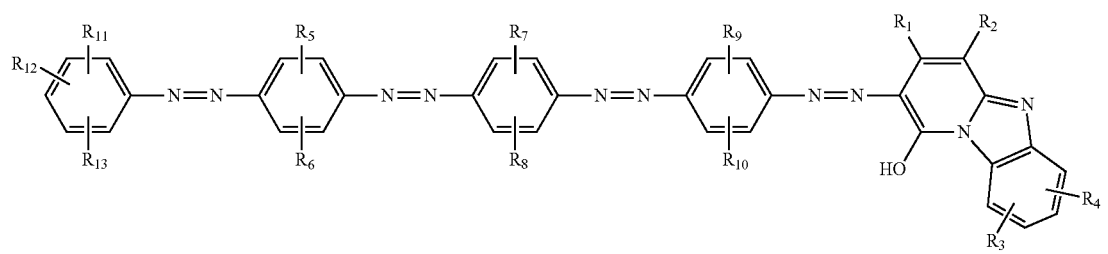

(I)

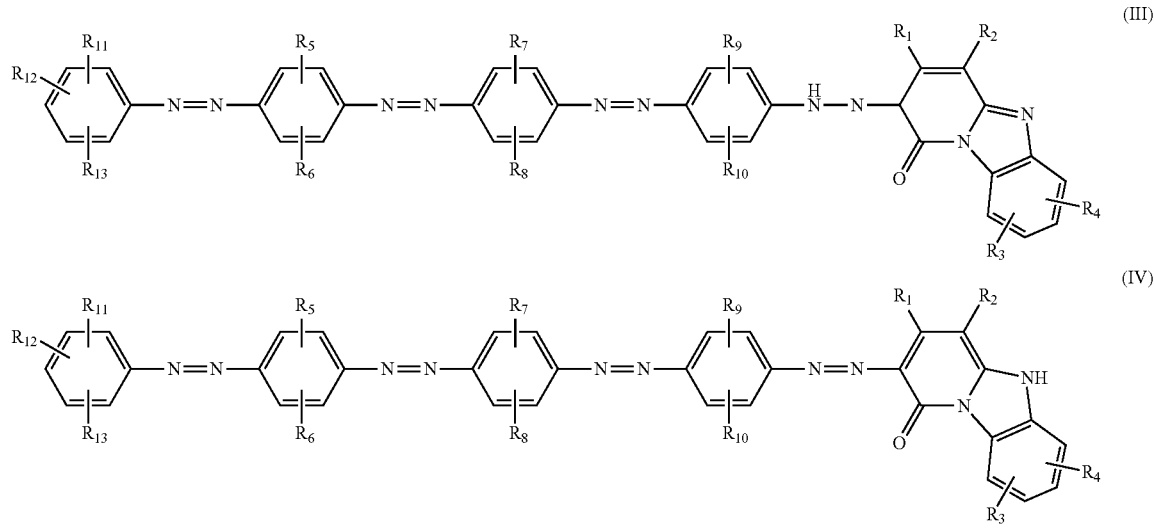

Examples of the alkyl group having 1 to 4 carbon atoms represented by $R_1$ in the general formula (I) can include linear or branched, unsubstituted alkyl groups. Of those, a linear and unsubstituted alkyl group is preferred. Specific examples of the alkyl group having 1 to 4 carbon atoms can include: linear alkyl groups such as methyl, ethyl, n-propyl, and n-butyl groups; and branched alkyl groups such as isopropyl, isobutyl, sec-butyl, and tert-butyl groups. Of those, a methyl group or an n-propyl group is preferred, and a methyl group is more preferred.

Examples of the alkyl group having 1 to 4 carbon atoms and being substituted with a carboxy group represented by $R_1$ in the general formula (I) can include groups obtained by substituting any carbon atom of the unsubstituted alkyl groups with a carboxy group. The substitution position of a carboxy group is preferably a terminal of the alkyl group. In addition, the substitution number of carboxy groups is preferably 1 or 2, more preferably 1. Specific examples of the alkyl group having 1 to 4 carbon atoms and being substituted with a carboxy group can include carboxymethyl and 2-carboxyethyl groups. Of those, a carboxymethyl group is preferred.

A phenyl group substituted with 1 to 3 sulfonic groups, preferably 1 or 2 sulfonic groups can be given as an example of the phenyl group substituted with a sulfonic group represented by $R_1$ in the general formula (I). Specific examples of the phenyl group substituted with a sulfonic group can include 3-sulfophenyl, 4-sulfophenyl, 2,4-disulfophenyl, and 3,5-disulfophenyl groups. Of those, a 4-sulfophenyl group is preferred.

$R_1$ in the general formula (I) preferably represents an alkyl group having 1 to 4 carbon atoms, an alkyl group having 1 to 4 carbon atoms and being substituted with a carboxy group, a phenyl group, or a phenyl group substituted with a sulfonic group. $R_1$ more preferably represents an alkyl group having 1 to 4 carbon atoms, a phenyl group, or a phenyl group substituted with a sulfonic group, and still more preferably represents an alkyl group having 1 to 4 carbon atoms or a phenyl group. $R_1$ particularly preferably represents an alkyl group having 1 to 4 carbon atoms and most preferably represents a methyl group.

$R_2$ in the general formula (I) preferably represents a cyano group or a carbamoyl group, and more preferably represents a cyano group.

Examples of the alkyl group having 1 to 4 carbon atoms represented by any one of $R_3$ and $R_4$ in the general formula (I) can include the same examples as those exemplified for the alkyl group having 1 to 4 carbon atoms represented by $R_1$ including preferred examples.

Examples of the halogen atom represented by either one of $R_3$ and $R_4$ in the general formula (I) can include a fluorine atom, a chlorine atom, a bromine atom, and an iodine atom. Of those, a chlorine atom is preferred.

Examples of the alkoxy group having 1 to 4 carbon atoms represented by any one of $R_3$ and $R_4$ in the general formula (I) can include linear or branched alkoxy groups. Of those, a linear alkoxy group is preferred. The alkoxy group, which may have a substituent, is preferably an unsubstituted alkoxy group. Specific examples of the alkoxy group having 1 to 4 carbon atoms can include: linear alkoxy groups such as methoxy, ethoxy, n-propoxy, and n-butoxy groups; and branched alkoxy groups such as isopropoxy, isobutoxy, sec-butoxy, and tert-butoxy groups. Of those, a methoxy group is particularly preferred.

It is preferred that $R_3$ and $R_4$ in the general formula (I) each independently represent a hydrogen atom, an alkyl group having 1 to 4 carbon atoms, an alkoxy group having 1 to 4 carbon atoms, or a sulfonic group. In addition, a combination in which one of $R_3$ and $R_4$ represents a hydrogen atom, and the other represents a sulfonic group is more preferred. When one of $R_3$ and $R_4$ represents a hydrogen atom, and the other represents a sulfonic group, the substitution position of the sulfonic group is preferably one of the two carbon atoms constituting a benzimidazolopyrrolidone ring and not being adjacent to any nitrogen atom. The compound represented by the general formula (I) may be a mixture containing at least two kinds of positional isomers different from each other in substitution positions of $R_3$ and $R_4$ from the viewpoints of the ease of synthesis and a cost.

A suitable combination of $R_1$ to $R_4$ in the general formula (I) is as follows:
$R_1$: an alkyl group having 1 to 4 carbon atoms or a phenyl group (preferably an alkyl group having 1 to 4 carbon atoms, more preferably a methyl group);
$R_2$: a cyano group or a carbamoyl group (preferably a cyano group);

$R_3$: a hydrogen atom, a methyl group, or a methoxy group (preferably a methoxy group); and $R_4$: a sulfonic group.

Examples of the alkylthio group having 1 to 4 carbon atoms represented by any one of $R_5$ and $R_7$ in the general formula (I) can include unsubstituted alkylthio groups whose alkyl is linear or branched. Of those, a linear and unsubstituted alkylthio group is preferred. Specific examples of the alkylthio group having 1 to 4 carbon atoms can include: linear alkylthio groups such as methylthio, ethylthio, n-propylthio, and n-butylthio groups; and branched alkylthio groups such as isopropylthio, isobutylthio, sec-butylthio, and tert-butylthio groups.

Examples of the alkylthio group having 1 to 4 carbon atoms and being substituted with a specific substituent represented by any one of $R_5$ and $R_7$ in the general formula (I) can include a group obtained by bonding the specific substituent to an arbitrary carbon atom constituting an alkylthio group having 1 to 4 carbon atoms. The specific substituent is at least one kind of group selected from the group consisting of a hydroxy group, a sulfonic group, and a carboxy group. The number of substituents is preferably 1 or 2, more preferably 1. The position of the substituent is preferably a carbon atom except the carbon atom to which a sulfur atom constituting the alkylthio group is bonded. Specific examples of the alkylthio group having 1 to 4 carbon atoms and being substituted with the specific substituent can include: hydroxyalkylthio groups such as 2-hydroxyethylthio, 2-hydroxypropylthio, and 3-hydroxypropylthio groups; sulfoalkylthio groups such as 2-sulfoethylthio and 3-sulfopropylthio groups; and carboxyalkylthio groups such as 2-carboxyethylthio, 3-carboxypropylthio, and 4-carboxybutylthio groups.

$R_5$ and $R_7$ in the general formula (I) each independently represent preferably a sulfoalkylthio group or a carboxyalkylthio group, more preferably a sulfoalkylthio group, particularly preferably a sulfopropylthio group.

Examples of the alkylcarbonylamino group having 1 to 4 carbon atoms represented by any one of $R_6$ and $R_8$ in the general formula (I) can include alkylcarbonylamino groups whose alkyl is linear or branched. Of those, a linear alkylcarbonylamino group is preferred. The alkylcarbonylamino group, which may have a substituent, is preferably an unsubstituted alkylcarbonylamino group. Specific examples of the alkylcarbonylamino group having 1 to 4 carbon atoms can include: linear and unsubstituted alkylcarbonylamino groups such as acetylamino (methylcarbonylamino), propionylamino (ethylcarbonylamino), n-propylcarbonylamino, and n-butylcarbonylamino groups; and branched and unsubstituted alkylcarbonylamino groups such as isopropylcarbonylamino, isobutylcarbonylamino, sec-butylcarbonylamino, and pivaloylamino (tert-butylcarbonylamino) groups. Of those, a linear and unsubstituted alkylcarbonylamino group is preferred and an acetylamino group is more preferred.

A preferred combination of $R_5$ and $R_6$ in the general formula (I) is such that $R_5$ represents a sulfoalkylthio group having 1 to 4 carbon atoms and $R_6$ represents an acetylamino group. In addition, it is more preferred that $R_5$ represent a sulfopropylthio group and $R_6$ represent an acetylamino group.

A preferred combination of $R_7$ and $R_8$ in the general formula (I) is such that $R_7$ represents a sulfoalkylthio group having 1 to 4 carbon atoms and $R_8$ represents an acetylamino group. In addition, it is more preferred that $R_7$ represent a sulfopropylthio group and $R_8$ represent an acetylamino group.

Examples of the halogen atom represented by any one of $R_9$ and $R_{10}$ in the general formula (I) can include a fluorine atom, a chlorine atom, a bromine atom, and an iodine atom. Of those, a chlorine atom is preferred.

Examples of the alkyl group having 1 to 4 carbon atoms represented by any one of $R_9$ and $R_{10}$ in the general formula (I) can include the same examples as those exemplified for the alkyl group having 1 to 4 carbon atoms represented by $R_1$ including preferred examples.

Examples of the alkoxy group having 1 to 4 carbon atoms represented by any one of $R_9$ and $R_{10}$ in the general formula (I) can include the same examples as those exemplified for the alkoxy group having 1 to 4 carbon atoms represented by any one of $R_3$ and $R_4$ including preferred examples.

Examples of the alkoxy group having 1 to 4 carbon atoms and being substituted with a specific substituent represented by any one of $R_9$ and $R_{10}$ in the general formula (I) can include a group obtained by bonding the specific substituent to an arbitrary carbon atom constituting an alkoxy group having 1 to 4 carbon atoms. The specific substituent is at least one kind of group selected from the group consisting of a hydroxy group, an alkoxy group having 1 to 4 carbon atoms, a sulfonic group, and a carboxy group. The number of substituents is preferably 1 or 2, more preferably 1. The position of the substituent is preferably a carbon atom except the carbon atom to which an oxygen atom constituting the alkoxy group is bonded. Specific examples of the alkoxy group having 1 to 4 carbon atoms and being substituted with the specific substituent may include: hydroxyalkoxy groups such as 2-hydroxyethoxy, 2-hydroxypropoxy, and 3-hydroxypropoxy groups; sulfoalkoxy groups such as 2-sulfoethoxy, 3-sulfopropoxy, and 4-sulfobutoxy groups; and carboxyalkoxy groups such as 2-carboxyethoxy, 3-carboxypropoxy, and 4-carboxybutoxy groups.

$R_9$ represents preferably a sulfoalkoxy group or a carboxyalkoxy group, more preferably a sulfoalkoxy group, particularly preferably a sulfopropoxy group or a sulfobutoxy group. In addition, $R_{10}$ represents preferably an alkyl group, an alkoxy group, a sulfoalkoxy group, a carboxyalkoxy group, or an acetylamino group, more preferably an alkyl group, particularly preferably a methyl group.

A preferred combination of $R_9$ and $R_{10}$ in the general formula (I) is such that $R_9$ represents a sulfoalkoxy group and $R_{10}$ represents an alkyl group. In addition, it is more preferred that $R_9$ represent a sulfopropoxy group (in particular, a 3-sulfopropoxy group) or a sulfobutoxy group (in particular, a 4-sulfobutoxy group), and $R_{10}$ represent a methyl group.

Examples of the halogen atom represented by any one of $R_{11}$, $R_{12}$, and $R_{13}$ in the general formula (I) can include a fluorine atom, a chlorine atom, a bromine atom, and an iodine atom. Of those, a chlorine atom is preferred.

Examples of the alkyl group having 1 to 4 carbon atoms represented by any one of $R_{11}$, $R_{12}$, and $R_{13}$ in the general formula (I) can include the same examples as those exemplified for the alkyl group having 1 to 4 carbon atoms represented by $R_1$ including preferred examples.

Examples of the alkoxy group having 1 to 4 carbon atoms represented by any one of $R_{11}$, $R_{12}$, and $R_{13}$ in the general formula (I) can include the same examples as those exemplified for the alkoxy group having 1 to 4 carbon atoms represented by any one of $R_3$ and $R_4$ including preferred examples.

Examples of the alkoxy group having 1 to 4 carbon atoms and being substituted with a specific substituent represented by any one of $R_{11}$, $R_{12}$, and $R_{13}$ in the general formula (I) can include the same examples as those exemplified for the alkoxy group having 1 to 4 carbon atoms and being substituted with a specific substituent represented by any one of $R_9$ and $R_{10}$. In addition, preferred examples of the alkoxy group having 1 to 4 carbon atoms and being substituted with a specific substituent are the same as those exemplified in $R_9$ and $R_{10}$. It should be noted that the specific substituent is at least one kind of group selected from the group consisting of a hydroxy group, an alkoxy group having 1 to 4 carbon atoms, a sulfonic group, and a carboxy group.

Examples of the alkylsulfonyl group having 1 to 4 carbon atoms represented by any one of $R_{11}$, $R_{12}$, and $R_{13}$ in the general formula (I) can include linear or branched, unsubstituted alkylsulfonyl groups. Of those, a linear and unsubstituted alkylsulfonyl group is preferred. Specific examples of the alkylsulfonyl group having 1 to 4 carbon atoms can include: linear alkylsulfonyl groups such as methylsulfonyl, ethylsulfonyl, n-propylsulfonyl, and n-butylsulfonyl groups; and branched alkylsulfonyl groups such as isopropylsulfonyl and isobutylsulfonyl groups. Of those, a methylsulfonyl group, an ethylsulfonyl group, or an isopropylsulfonyl group is preferred, and a methylsulfonyl group is more preferred.

Examples of the alkylsulfonyl group having 1 to 4 carbon atoms and being substituted with a specific substituent represented by any one of $R_{11}$, $R_{12}$, and $R_{13}$ in the general formula (I) can include a group obtained by bonding the specific substituent to an arbitrary carbon atom constituting the alkylsulfonyl group having 1 to 4 carbon atoms. The specific substituent is at least one kind of group selected from the group consisting of a hydroxy group, a sulfonic group, and a carboxy group. The number of substituents is preferably 1 or 2, more preferably 1. Specific examples of the alkylsulfonyl group having 1 to 4 carbon atoms and being substituted with the specific substituent can include hydroxyethylsulfonyl, 2-hydroxypropylsulfonyl, 2-sulfoethylsulfonyl, 3-sulfopropylsulfonyl, 2-carboxyethylsulfonyl, and 3-carboxypropylsulfonyl groups.

$R_{11}$ preferably represents a hydrogen atom, a carboxy group, a sulfonic group, a chlorine atom, a nitro group, a methyl group, a methoxy group, or an alkylsulfonyl group having 1 to 4 carbon atoms. In addition, $R_{11}$ more preferably represents a hydrogen atom; a carboxy group, sulfonic group, chlorine atom, nitro group, or alkylsulfonyl group having 1 to 4 carbon atoms, which is an electron-withdrawing group; a methyl group; or a methoxy group, and particularly preferably represents a hydrogen atom or a chlorine atom.

$R_{12}$ preferably represents a hydrogen atom, a carboxy group, a sulfonic group, a chlorine atom, a nitro group, a sulfamoyl group, a methyl group, a methoxy group, an alkylsulfonyl group having 1 to 4 carbon atoms, a carboxyalkylsulfonyl group (whose alkyl has 1 to 4 carbon atoms), or a sulfoalkylsulfonyl group having 1 to 4 carbon atoms (whose alkyl has 1 to 4 carbon atoms). In addition, $R_{12}$ more preferably represents a hydrogen atom; a carboxy group, sulfonic group, chlorine atom, nitro group, sulfamoyl group, alkylsulfonyl group having 1 to 4 carbon atoms, carboxyalkylsulfonyl group (whose alkyl has 1 to 4 carbon atoms), or sulfoalkylsulfonyl group having 1 to 4 carbon atoms (whose alkyl has 1 to 4 carbon atoms), which is an electron-withdrawing group; a methyl group, or a methoxy group, particularly preferably represents a sulfonic group, a nitro group, a sulfamoyl group, a methyl group, a methoxy group, a sulfopropylsulfonyl group, or a carboxyethylsulfonyl group, and most preferably represents a sulfonic group.

$R_{13}$ preferably represents a hydrogen atom, a carboxy group, a sulfonic group, a methoxy group, a chlorine atom, a nitro group, or an alkylsulfonyl group having 1 to 4 carbon atoms. In addition, $R_{13}$ more preferably represents a hydrogen atom; a carboxy group, sulfonic group, chlorine atom, nitro group, or alkylsulfonyl group having 1 to 4 carbon atoms, which is an electron-withdrawing group; or a methoxy group, and particularly preferably represents a hydrogen atom.

Suitable combinations of $R_{11}$, $R_{12}$, and $R_{13}$ in the general formula (I) are the following combinations (a), (b), and (c), and of the combinations, the combination (c) is particularly preferred:

(a) a combination in which $R_{11}$ represents a hydrogen atom, $R_{12}$ represents a sulfonic group, and $R_{13}$ represents a hydrogen atom;

(b) a combination in which $R_{11}$ represents a hydrogen atom, $R_{12}$ represents a sulfamoyl group, and $R_{13}$ represents a hydrogen atom; and (c) a combination in which $R_{11}$ represents a hydrogen atom, $R_{12}$ represents a chlorine atom, and $R_{13}$ represents a sulfonic group.

Of the compounds represented by the general formula (I), a compound represented by the following general formula (V) is preferred.

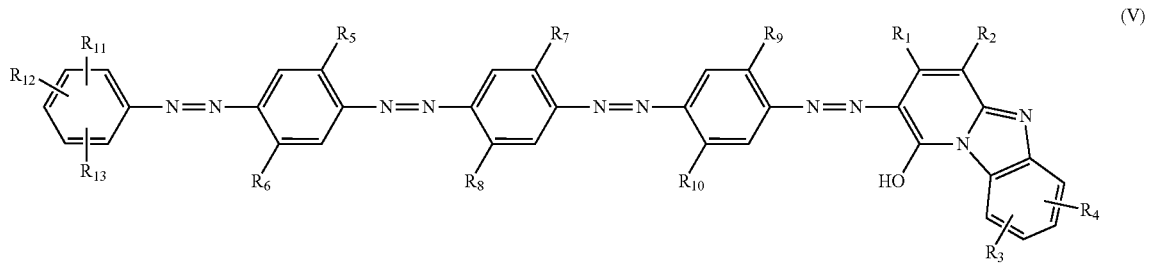

(V)

$R_1$ to $R_{13}$ in the general formula (V) are identical in meaning to $R_1$ to $R_{13}$ in the general formula (I), and their preferred groups and a combination thereof are also identical to those in the case of the general formula (I). In addition, when the substitution position of an azo group in a benzene ring substituted with $R_{11}$, $R_{12}$, and $R_{13}$ in the general formula (V) is defined as a 1-position, it is preferred that the substitution position of $R_{11}$ be a 2-position or a 3-position, the substitution position of $R_{12}$ be a 4-position, and the substitution position of $R_{13}$ be a 5-position or a 6-position. Suitable combinations of $R_1$ to $R_{13}$ in the general formula (I) are the following combinations (i) and (ii). The combination (ii) is preferred to the combination (i).

(i)
$R_1$: a methyl group
$R_2$: a cyano group or a carbamoyl group
$R_3$: a hydrogen atom, a methyl group, or a methoxy group
$R_4$: a sulfonic group
$R_5$: a sulfoalkylthio group having 1 to 4 carbon atoms $R_6$: an alkylcarbonylamino group having 1 to 4 carbon atoms
$R_7$: a sulfoalkylthio group having 1 to 4 carbon atoms
$R_8$: an alkylcarbonylamino group (whose alkyl has 1 to 4 carbon atoms)
$R_9$: a sulfoalkoxy group having 1 to 4 carbon atoms
$R_{10}$: an alkyl having 1 to 4 carbon atoms or an acetylamino group
$R_{11}$, $R_{12}$ and $R_{13}$: each independently represent a hydrogen atom, a sulfonic group, a methyl group, a methoxy group, a chlorine atom, a nitro group, or a sulfamoyl group
(ii)
$R_1$: a methyl group
$R_2$: a cyano group
$R_3$: a hydrogen atom or a methoxy group
$R_4$: a sulfonic group
$R_5$: a sulfoalkylthio group having 1 to 4 carbon atoms
$R_6$: an acetylamino group
$R_7$: a sulfoalkylthio group having 1 to 4 carbon atoms
$R_8$: an acetylamino group
$R_9$: a sulfopropoxy group or a sulfobutoxy group
$R_{10}$: an alkyl group having 1 to 4 carbon atoms
$R_{11}$: a hydrogen atom or a sulfonic group
$R_{12}$: a sulfonic group or a chlorine atom
$R_{13}$: a hydrogen atom or a sulfonic group Suitable specific examples of the compound represented by the general formula (I) can include Exemplified Compounds 1 to 90 shown in Table 1-1 to 1-3. It should be noted that in Table 1-1 to 1-3, each exemplified compound is shown in the form of the following general formula (V') as a free acid form (H form). It should be appreciated that the compound to be used in the present invention is not limited to the exemplified compounds shown in Table 1-1 to 1-3 as long as the compound is included in the structure of the general formula (I) and the definition thereof. In the present invention, of the exemplified compounds shown in Table 1-1 to 1-3, Exemplified Compounds 1 to 12, 19, and 20 are preferred, Exemplified Compounds 7 to 12, 19, and 20 are more preferred, and Exemplified Compounds 7 to 12 are particularly preferred.

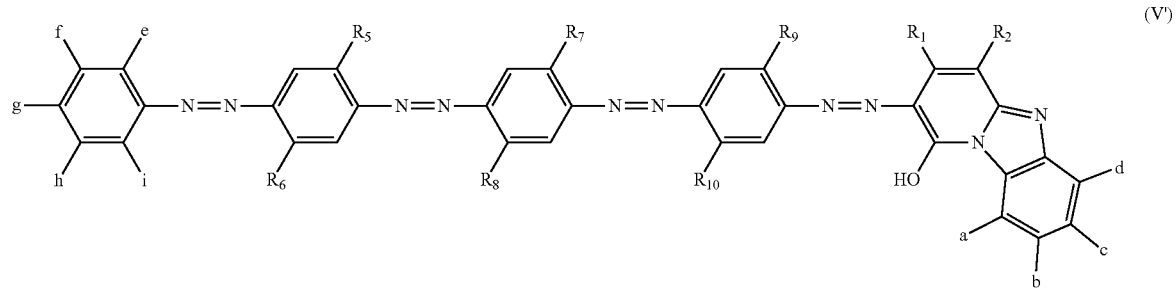

(V')

TABLE 1-1

Exemplified compounds of general formula (I)

| Exemplified Compound | $R_1$ | $R_2$ | a | b | c | d | $R_5 \cdot R_7$ | $R_6 \cdot R_8$ | $R_9$ | $R_{10}$ | e | f | g | h | i |
|---|---|---|---|---|---|---|---|---|---|---|---|---|---|---|---|
| 1 | $CH_3$ | CN | H | H | $SO_3H$ | $CH_3$ | $SC_3H_6SO_3H$ | $NHCOCH_3$ | $OC_3H_6SO_3H$ | $CH_3$ | H | H | Cl | $SO_3H$ | H |
| 2 | $CH_3$ | CN | H | $SO_3H$ | H | $CH_3$ | $SC_3H_6SO_3H$ | $NHCOCH_3$ | $OC_3H_6SO_3H$ | $CH_3$ | H | H | Cl | $SO_3H$ | H |
| 3 | $CH_3$ | CN | $SO_3H$ | H | H | $CH_3$ | $SC_3H_6SO_3H$ | $NHCOCH_3$ | $OC_3H_6SO_3H$ | $CH_3$ | H | H | Cl | $SO_3H$ | H |
| 4 | $CH_3$ | CN | $CH_3$ | $SO_3H$ | H | H | $SC_3H_6SO_3H$ | $NHCOCH_3$ | $OC_3H_6SO_3H$ | $CH_3$ | H | H | Cl | $SO_3H$ | H |
| 5 | $CH_3$ | CN | $CH_3$ | H | $SO_3H$ | H | $SC_3H_6SO_3H$ | $NHCOCH_3$ | $OC_3H_6SO_3H$ | $CH_3$ | H | H | Cl | $SO_3H$ | H |
| 6 | $CH_3$ | CN | $CH_3$ | H | H | $SO_3H$ | $SC_3H_6SO_3H$ | $NHCOCH_3$ | $OC_3H_6SO_3H$ | $CH_3$ | H | H | Cl | $SO_3H$ | H |
| 7 | $CH_3$ | CN | H | $OCH_3$ | $SO_3H$ | H | $SC_3H_6SO_3H$ | $NHCOCH_3$ | $OC_3H_6SO_3H$ | $CH_3$ | H | H | Cl | $SO_3H$ | H |
| 8 | $CH_3$ | CN | $SO_3H$ | $OCH_3$ | H | H | $SC_3H_6SO_3H$ | $NHCOCH_3$ | $OC_3H_6SO_3H$ | $CH_3$ | H | H | Cl | $SO_3H$ | H |
| 9 | $CH_3$ | CN | H | $OCH_3$ | H | $SO_3H$ | $SC_3H_6SO_3H$ | $NHCOCH_3$ | $OC_3H_6SO_3H$ | $CH_3$ | H | H | Cl | $SO_3H$ | H |
| 10 | $CH_3$ | CN | H | $SO_3H$ | $OCH_3$ | H | $SC_3H_6SO_3H$ | $NHCOCH_3$ | $OC_3H_6SO_3H$ | $CH_3$ | H | H | Cl | $SO_3H$ | H |
| 11 | $CH_3$ | CN | $SO_3H$ | H | $OCH_3$ | H | $SC_3H_6SO_3H$ | $NHCOCH_3$ | $OC_3H_6SO_3H$ | $CH_3$ | H | H | Cl | $SO_3H$ | H |
| 12 | $CH_3$ | CN | H | H | $OCH_3$ | $SO_3H$ | $SC_3H_6SO_3H$ | $NHCOCH_3$ | $OC_3H_6SO_3H$ | $CH_3$ | H | H | Cl | $SO_3H$ | H |
| 13 | $CH_3$ | CN | H | H | $SO_3H$ | $CH_3$ | $SC_3H_6SO_3H$ | $NHCOCH_3$ | $OC_4H_8SO_3H$ | $CH_3$ | H | H | Cl | $SO_3H$ | H |
| 14 | $CH_3$ | CN | H | $SO_3H$ | H | $CH_3$ | $SC_3H_6SO_3H$ | $NHCOCH_3$ | $OC_4H_8SO_3H$ | $CH_3$ | H | H | Cl | $SO_3H$ | H |
| 15 | $CH_3$ | CN | $SO_3H$ | H | H | $CH_3$ | $SC_3H_6SO_3H$ | $NHCOCH_3$ | $OC_4H_8SO_3H$ | $CH_3$ | H | H | Cl | $SO_3H$ | H |
| 16 | $CH_3$ | CN | $CH_3$ | $SO_3H$ | H | H | $SC_3H_6SO_3H$ | $NHCOCH_3$ | $OC_4H_8SO_3H$ | $CH_3$ | H | H | Cl | $SO_3H$ | H |
| 17 | $CH_3$ | CN | $CH_3$ | H | $SO_3H$ | H | $SC_3H_6SO_3H$ | $NHCOCH_3$ | $OC_4H_8SO_3H$ | $CH_3$ | H | H | Cl | $SO_3H$ | H |
| 18 | $CH_3$ | CN | $CH_3$ | H | H | $SO_3H$ | $SC_3H_6SO_3H$ | $NHCOCH_3$ | $OC_4H_8SO_3H$ | $CH_3$ | H | H | Cl | $SO_3H$ | H |
| 19 | $CH_3$ | CN | H | H | $SO_3H$ | H | $SC_3H_6SO_3H$ | $NHCOCH_3$ | $OC_3H_6SO_3H$ | $CH_3$ | H | H | Cl | $SO_3H$ | H |
| 20 | $CH_3$ | CN | H | $SO_3H$ | H | H | $SC_3H_6SO_3H$ | $NHCOCH_3$ | $OC_3H_6SO_3H$ | $CH_3$ | H | H | Cl | $SO_3H$ | H |
| 21 | $CH_3$ | CN | H | H | $SO_3H$ | H | $SC_3H_6SO_3H$ | $NHCOCH_3$ | $OC_4H_8SO_3H$ | $CH_3$ | H | H | Cl | $SO_3H$ | H |
| 22 | $CH_3$ | CN | H | H | $SO_3H$ | H | $SC_3H_6SO_3H$ | $NHCOCH_3$ | $OC_4H_8SO_3H$ | $CH_3$ | H | H | Cl | $SO_3H$ | H |
| 23 | $CH_3$ | CN | H | H | $SO_3H$ | H | $SC_3H_6SO_3H$ | $NHCOCH_3$ | $OC_3H_6SO_3H$ | $CH_3$ | Cl | H | Cl | $SO_3H$ | H |
| 24 | $CH_3$ | CN | H | $SO_3H$ | H | H | $SC_3H_6SO_3H$ | $NHCOCH_3$ | $OC_3H_6SO_3H$ | $CH_3$ | Cl | H | Cl | $SO_3H$ | H |
| 25 | $CH_3$ | CN | H | H | $SO_3H$ | $CH_3$ | $SC_3H_6SO_3H$ | $NHCOCH_3$ | $OC_3H_6SO_3H$ | $CH_3$ | H | H | $SO_3H$ | H | H |
| 26 | $CH_3$ | CN | H | $SO_3H$ | H | $CH_3$ | $SC_3H_6SO_3H$ | $NHCOCH_3$ | $OC_3H_6SO_3H$ | $CH_3$ | H | H | $SO_3H$ | H | H |
| 27 | $CH_3$ | CN | $SO_3H$ | H | H | $CH_3$ | $SC_3H_6SO_3H$ | $NHCOCH_3$ | $OC_3H_6SO_3H$ | $CH_3$ | H | H | $SO_3H$ | H | H |
| 28 | $CH_3$ | CN | $CH_3$ | $SO_3H$ | H | H | $SC_3H_6SO_3H$ | $NHCOCH_3$ | $OC_3H_6SO_3H$ | $CH_3$ | H | H | $SO_3H$ | H | H |
| 29 | $CH_3$ | CN | $CH_3$ | H | $SO_3H$ | H | $SC_3H_6SO_3H$ | $NHCOCH_3$ | $OC_3H_6SO_3H$ | $CH_3$ | H | H | $SO_3H$ | H | H |
| 30 | $CH_3$ | CN | $CH_3$ | H | H | $SO_3H$ | $SC_3H_6SO_3H$ | $NHCOCH_3$ | $OC_3H_6SO_3H$ | $CH_3$ | H | H | $SO_3H$ | H | H |

TABLE 1-2

Exemplified compounds of general formula (I)

| Exemplified Compound | $R_1$ | $R_2$ | a | b | c | d | $R_5 \cdot R_7$ | $R_6 \cdot R_8$ | $R_9$ | $R_{10}$ | e | f | g | h | i |
|---|---|---|---|---|---|---|---|---|---|---|---|---|---|---|---|
| 31 | $CH_3$ | CN | H | $OCH_3$ | $SO_3H$ | H | $SC_3H_6SO_3H$ | $NHCOCH_3$ | $OC_3H_6SO_3H$ | $CH_3$ | H | H | $SO_3H$ | H | H |
| 32 | $CH_3$ | CN | $SO_3H$ | $OCH_3$ | H | H | $SC_3H_6SO_3H$ | $NHCOCH_3$ | $OC_3H_6SO_3H$ | $CH_3$ | H | H | $SO_3H$ | H | H |
| 33 | $CH_3$ | CN | H | $OCH_3$ | H | $SO_3H$ | $SC_3H_6SO_3H$ | $NHCOCH_3$ | $OC_3H_6SO_3H$ | $CH_3$ | H | H | $SO_3H$ | H | H |
| 34 | $CH_3$ | CN | H | $SO_3H$ | $OCH_3$ | H | $SC_3H_6SO_3H$ | $NHCOCH_3$ | $OC_3H_6SO_3H$ | $CH_3$ | H | H | $SO_3H$ | H | H |
| 35 | $CH_3$ | CN | $SO_3H$ | H | $OCH_3$ | H | $SC_3H_6SO_3H$ | $NHCOCH_3$ | $OC_3H_6SO_3H$ | $CH_3$ | H | H | $SO_3H$ | H | H |
| 36 | $CH_3$ | CN | H | H | $OCH_3$ | $SO_3H$ | $SC_3H_6SO_3H$ | $NHCOCH_3$ | $OC_3H_6SO_3H$ | $CH_3$ | H | H | $SO_3H$ | H | H |
| 37 | $CH_3$ | CN | H | $OCH_3$ | $SO_3H$ | H | $SC_3H_6SO_3H$ | $NHCOCH_3$ | $OC_3H_6SO_3H$ | $CH_3$ | H | H | $SO_3H$ | Cl | H |
| 38 | $CH_3$ | CN | $SO_3H$ | $OCH_3$ | H | H | $SC_3H_6SO_3H$ | $NHCOCH_3$ | $OC_3H_6SO_3H$ | $CH_3$ | H | H | $SO_3H$ | Cl | H |
| 39 | $CH_3$ | CN | H | $OCH_3$ | H | $SO_3H$ | $SC_3H_6SO_3H$ | $NHCOCH_3$ | $OC_3H_6SO_3H$ | $CH_3$ | H | H | $SO_3H$ | Cl | H |
| 40 | $CH_3$ | CN | H | $SO_3H$ | $OCH_3$ | H | $SC_3H_6SO_3H$ | $NHCOCH_3$ | $OC_3H_6SO_3H$ | $CH_3$ | H | H | $SO_3H$ | Cl | H |
| 41 | $CH_3$ | CN | $SO_3H$ | H | $OCH_3$ | H | $SC_3H_6SO_3H$ | $NHCOCH_3$ | $OC_3H_6SO_3H$ | $CH_3$ | H | H | $SO_3H$ | Cl | H |
| 42 | $CH_3$ | CN | H | H | $OCH_3$ | $SO_3H$ | $SC_3H_6SO_3H$ | $NHCOCH_3$ | $OC_3H_6SO_3H$ | $CH_3$ | H | H | $SO_3H$ | Cl | H |
| 43 | $CH_3$ | CN | H | H | $SO_3H$ | $CH_3$ | $SC_3H_6SO_3H$ | $NHCOCH_3$ | $OC_3H_6SO_3H$ | $NHCOCH_3$ | H | H | $SO_3H$ | H | H |
| 44 | $CH_3$ | CN | H | $SO_3H$ | H | $CH_3$ | $SC_3H_6SO_3H$ | $NHCOCH_3$ | $OC_3H_6SO_3H$ | $NHCOCH_3$ | H | H | $SO_3H$ | H | H |
| 45 | $CH_3$ | CN | $SO_3H$ | H | H | $CH_3$ | $SC_3H_6SO_3H$ | $NHCOCH_3$ | $OC_3H_6SO_3H$ | $NHCOCH_3$ | H | H | $SO_3H$ | H | H |
| 46 | $CH_3$ | CN | $CH_3$ | $SO_3H$ | H | H | $SC_3H_6SO_3H$ | $NHCOCH_3$ | $OC_3H_6SO_3H$ | $NHCOCH_3$ | H | H | $SO_3H$ | H | H |
| 47 | $CH_3$ | CN | $CH_3$ | H | $SO_3H$ | H | $SC_3H_6SO_3H$ | $NHCOCH_3$ | $OC_3H_6SO_3H$ | $NHCOCH_3$ | H | H | $SO_3H$ | H | H |
| 48 | $CH_3$ | CN | $CH_3$ | H | H | $SO_3H$ | $SC_3H_6SO_3H$ | $NHCOCH_3$ | $OC_3H_6SO_3H$ | $NHCOCH_3$ | H | H | $SO_3H$ | H | H |
| 49 | $CH_3$ | $CONH_2$ | H | $OCH_3$ | $SO_3H$ | H | $SC_3H_6SO_3H$ | $NHCOCH_3$ | $OC_3H_6SO_3H$ | $CH_3$ | H | H | Cl | $SO_3H$ | H |
| 50 | $CH_3$ | $CONH_2$ | $SO_3H$ | $OCH_3$ | H | H | $SC_3H_6SO_3H$ | $NHCOCH_3$ | $OC_3H_6SO_3H$ | $CH_3$ | H | H | Cl | $SO_3H$ | H |
| 51 | $CH_3$ | $CONH_2$ | H | $OCH_3$ | H | $SO_3H$ | $SC_3H_6SO_3H$ | $NHCOCH_3$ | $OC_3H_6SO_3H$ | $CH_3$ | H | H | Cl | $SO_3H$ | H |
| 52 | $CH_3$ | $CONH_2$ | H | $SO_3H$ | $OCH_3$ | H | $SC_3H_6SO_3H$ | $NHCOCH_3$ | $OC_3H_6SO_3H$ | $CH_3$ | H | H | Cl | $SO_3H$ | H |
| 53 | $CH_3$ | $CONH_2$ | $SO_3H$ | H | $OCH_3$ | H | $SC_3H_6SO_3H$ | $NHCOCH_3$ | $OC_3H_6SO_3H$ | $CH_3$ | H | H | Cl | $SO_3H$ | H |
| 54 | $CH_3$ | $CONH_2$ | H | H | $OCH_3$ | $SO_3H$ | $SC_3H_6SO_3H$ | $NHCOCH_3$ | $OC_3H_6SO_3H$ | $CH_3$ | H | H | Cl | $SO_3H$ | H |
| 55 | $CH_3$ | CN | H | H | $SO_3H$ | $CH_3$ | $SC_3H_6SO_3H$ | $NHCOCH_3$ | $OC_3H_6SO_3H$ | $NHCOCH_3$ | H | H | Cl | $SO_3H$ | H |
| 56 | $CH_3$ | CN | H | $SO_3H$ | H | $CH_3$ | $SC_3H_6SO_3H$ | $NHCOCH_3$ | $OC_3H_6SO_3H$ | $NHCOCH_3$ | H | H | Cl | $SO_3H$ | H |
| 57 | $CH_3$ | CN | $SO_3H$ | H | H | $CH_3$ | $SC_3H_6SO_3H$ | $NHCOCH_3$ | $OC_3H_6SO_3H$ | $NHCOCH_3$ | H | H | Cl | $SO_3H$ | H |
| 58 | $CH_3$ | CN | $CH_3$ | $SO_3H$ | H | H | $SC_3H_6SO_3H$ | $NHCOCH_3$ | $OC_3H_6SO_3H$ | $NHCOCH_3$ | H | H | Cl | $SO_3H$ | H |
| 59 | $CH_3$ | CN | $CH_3$ | H | $SO_3H$ | H | $SC_3H_6SO_3H$ | $NHCOCH_3$ | $OC_3H_6SO_3H$ | $NHCOCH_3$ | H | H | Cl | $SO_3H$ | H |
| 60 | $CH_3$ | CN | $CH_3$ | H | H | $SO_3H$ | $SC_3H_6SO_3H$ | $NHCOCH_3$ | $OC_3H_6SO_3H$ | $NHCOCH_3$ | H | H | Cl | $SO_3H$ | H |

TABLE 1-3

Exemplified compounds of general formula (I)

| Exemplified Compound | $R_1$ | $R_2$ | a | b | c | d | $R_5 \cdot R_7$ | $R_6 \cdot R_8$ | $R_9$ | $R_{10}$ | e | f | g | h | i |
|---|---|---|---|---|---|---|---|---|---|---|---|---|---|---|---|
| 61 | $CH_3$ | CN | H | $OCH_3$ | $SO_3H$ | H | $SC_3H_6SO_3H$ | $NHCOCH_3$ | $OC_3H_6SO_3H$ | $CH_3$ | CN | H | Cl | $SO_3H$ | H |
| 62 | $CH_3$ | CN | $SO_3H$ | $OCH_3$ | H | H | $SC_3H_6SO_3H$ | $NHCOCH_3$ | $OC_3H_6SO_3H$ | $CH_3$ | CN | H | Cl | $SO_3H$ | H |
| 63 | $CH_3$ | CN | H | $OCH_3$ | H | $SO_3H$ | $SC_3H_6SO_3H$ | $NHCOCH_3$ | $OC_3H_6SO_3H$ | $CH_3$ | CN | H | Cl | $SO_3H$ | H |
| 64 | $CH_3$ | CN | H | $SO_3H$ | $OCH_3$ | H | $SC_3H_6SO_3H$ | $NHCOCH_3$ | $OC_3H_6SO_3H$ | $CH_3$ | CN | H | Cl | $SO_3H$ | H |
| 65 | $CH_3$ | CN | $SO_3H$ | H | $OCH_3$ | H | $SC_3H_6SO_3H$ | $NHCOCH_3$ | $OC_3H_6SO_3H$ | $CH_3$ | CN | H | Cl | $SO_3H$ | H |
| 66 | $CH_3$ | CN | H | H | $OCH_3$ | $SO_3H$ | $SC_3H_6SO_3H$ | $NHCOCH_3$ | $OC_3H_6SO_3H$ | $CH_3$ | CN | H | Cl | $SO_3H$ | H |
| 67 | $CH_3$ | CN | H | H | $SO_3H$ | $CH_3$ | $SC_3H_6SO_3H$ | $NHCOCH_3$ | $OC_3H_6SO_3H$ | $NHCOCH_3$ | CN | H | Cl | $SO_3H$ | H |
| 68 | $CH_3$ | CN | H | $SO_3H$ | H | $CH_3$ | $SC_3H_6SO_3H$ | $NHCOCH_3$ | $OC_3H_6SO_3H$ | $NHCOCH_3$ | CN | H | Cl | $SO_3H$ | H |
| 69 | $CH_3$ | CN | $SO_3H$ | H | H | $CH_3$ | $SC_3H_6SO_3H$ | $NHCOCH_3$ | $OC_3H_6SO_3H$ | $NHCOCH_3$ | CN | H | Cl | $SO_3H$ | H |
| 70 | $CH_3$ | CN | $CH_3$ | $SO_3H$ | H | H | $SC_3H_6SO_3H$ | $NHCOCH_3$ | $OC_3H_6SO_3H$ | $NHCOCH_3$ | CN | H | Cl | $SO_3H$ | H |
| 71 | $CH_3$ | CN | $CH_3$ | H | $SO_3H$ | H | $SC_3H_6SO_3H$ | $NHCOCH_3$ | $OC_3H_6SO_3H$ | $NHCOCH_3$ | CN | H | Cl | $SO_3H$ | H |
| 72 | $CH_3$ | CN | $CH_3$ | H | H | $SO_3H$ | $SC_3H_6SO_3H$ | $NHCOCH_3$ | $OC_3H_6SO_3H$ | $NHCOCH_3$ | CN | H | Cl | $SO_3H$ | H |
| 73 | $CH_3$ | CN | H | $OCH_3$ | $SO_3H$ | H | $SC_3H_6SO_3H$ | $NHCOCH_3$ | $OC_3H_6SO_3H$ | $NHCOCH_3$ | CN | H | Cl | $SO_3H$ | H |
| 74 | $CH_3$ | CN | $SO_3H$ | $OCH_3$ | H | H | $SC_3H_6SO_3H$ | $NHCOCH_3$ | $OC_3H_6SO_3H$ | $NHCOCH_3$ | CN | H | Cl | $SO_3H$ | H |
| 75 | $CH_3$ | CN | H | $OCH_3$ | H | $SO_3H$ | $SC_3H_6SO_3H$ | $NHCOCH_3$ | $OC_3H_6SO_3H$ | $NHCOCH_3$ | CN | H | Cl | $SO_3H$ | H |
| 76 | $CH_3$ | CN | H | $SO_3H$ | $OCH_3$ | H | $SC_3H_6SO_3H$ | $NHCOCH_3$ | $OC_3H_6SO_3H$ | $NHCOCH_3$ | CN | H | Cl | $SO_3H$ | H |
| 77 | $CH_3$ | CN | $SO_3H$ | H | $OCH_3$ | H | $SC_3H_6SO_3H$ | $NHCOCH_3$ | $OC_3H_6SO_3H$ | $NHCOCH_3$ | CN | H | Cl | $SO_3H$ | H |
| 78 | $CH_3$ | CN | H | H | $OCH_3$ | $SO_3H$ | $SC_3H_6SO_3H$ | $NHCOCH_3$ | $OC_3H_6SO_3H$ | $NHCOCH_3$ | CN | H | Cl | $SO_3H$ | H |
| 79 | $CH_3$ | CN | H | H | $SO_3H$ | $CH_3$ | $SC_3H_6SO_3H$ | $NHCOCH_3$ | $OC_3H_6SO_3H$ | $CH_3$ | CN | H | Cl | $SO_3H$ | H |
| 80 | $CH_3$ | CN | H | $SO_3H$ | H | $CH_3$ | $SC_3H_6SO_3H$ | $NHCOCH_3$ | $OC_3H_6SO_3H$ | $CH_3$ | CN | H | Cl | $SO_3H$ | H |
| 81 | $CH_3$ | CN | $SO_3H$ | H | H | $CH_3$ | $SC_3H_6SO_3H$ | $NHCOCH_3$ | $OC_3H_6SO_3H$ | $CH_3$ | CN | H | Cl | $SO_3H$ | H |
| 82 | $CH_3$ | CN | $CH_3$ | $SO_3H$ | H | H | $SC_3H_6SO_3H$ | $NHCOCH_3$ | $OC_3H_6SO_3H$ | $CH_3$ | CN | H | Cl | $SO_3H$ | H |
| 83 | $CH_3$ | CN | $CH_3$ | H | $SO_3H$ | H | $SC_3H_6SO_3H$ | $NHCOCH_3$ | $OC_3H_6SO_3H$ | $CH_3$ | CN | H | Cl | $SO_3H$ | H |
| 84 | $CH_3$ | CN | $CH_3$ | H | H | $SO_3H$ | $SC_3H_6SO_3H$ | $NHCOCH_3$ | $OC_3H_6SO_3H$ | $CH_3$ | CN | H | Cl | $SO_3H$ | H |
| 85 | $CH_3$ | CN | H | $OCH_3$ | $SO_3H$ | H | $SC_3H_6SO_3H$ | $NHCOCH_3$ | $OC_3H_6SO_3H$ | $NHCOCH_3$ | H | H | Cl | COOH | H |
| 86 | $CH_3$ | CN | $SO_3H$ | $OCH_3$ | H | H | $SC_3H_6SO_3H$ | $NHCOCH_3$ | $OC_3H_6SO_3H$ | $NHCOCH_3$ | H | H | Cl | COOH | H |
| 87 | $CH_3$ | CN | H | $OCH_3$ | H | $SO_3H$ | $SC_3H_6SO_3H$ | $NHCOCH_3$ | $OC_3H_6SO_3H$ | $NHCOCH_3$ | H | H | Cl | COOH | H |
| 88 | $CH_3$ | CN | H | $SO_3H$ | $OCH_3$ | H | $SC_3H_6SO_3H$ | $NHCOCH_3$ | $OC_3H_6SO_3H$ | $NHCOCH_3$ | H | H | Cl | COOH | H |
| 89 | $CH_3$ | CN | $SO_3H$ | H | $OCH_3$ | H | $SC_3H_6SO_3H$ | $NHCOCH_3$ | $OC_3H_6SO_3H$ | $NHCOCH_3$ | H | H | Cl | COOH | H |
| 90 | $CH_3$ | CN | H | H | $OCH_3$ | $SO_3H$ | $SC_3H_6SO_3H$ | $NHCOCH_3$ | $OC_3H_6SO_3H$ | $NHCOCH_3$ | H | H | Cl | COOH | H |

The compound represented by the general formula (I) can be synthesized according to, for example, the following method. Hereinafter, the structural formula of a compound in each step is represented as a free acid form. It should be noted that $R_1$ to $R_{13}$ in the following general formulae (1) to (8) are identical in meaning to $R_1$ to $R_{13}$ in the general formula (I).

A diazo compound obtained by diazotizing a compound represented by the following general formula (I) according to an ordinary method and a compound represented by the following general formula (2) are subjected to a coupling reaction according to an ordinary method to provide a compound represented by the following general formula (3).

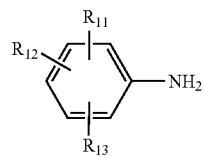
(1)

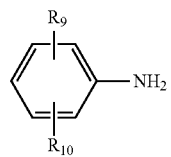
(2)

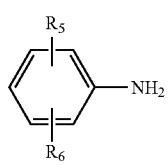
(3)

A diazo compound obtained by diazotizing the compound represented by the general formula (3) according to an ordinary method and a compound represented by the following general formula (4) are subjected to a coupling reaction according to an ordinary method to provide a compound represented by the following general formula (5).

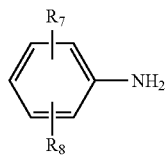
(4)

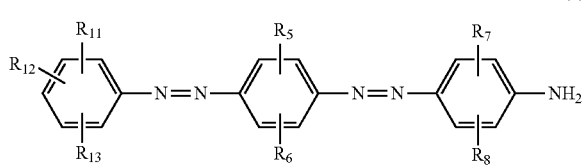
(5)

A diazo compound obtained by diazotizing the compound represented by the general formula (5) according to an ordinary method and a compound represented by the following general formula (6) are subjected to a coupling reaction according to an ordinary method to provide a compound represented by the following general formula (7).

(6)

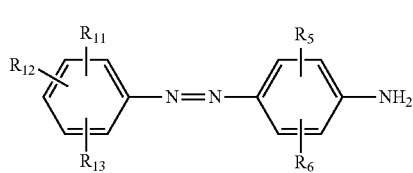

(7)

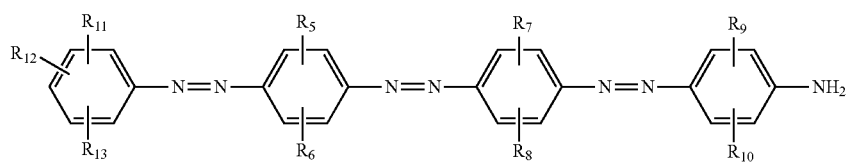

A diazo compound obtained by diazotizing the compound represented by the general formula (7) according to an ordinary method and a compound represented by the following general formula (8) are subjected to a coupling reaction according to an ordinary method. Thus, the compound represented by the general formula (I) can be obtained.

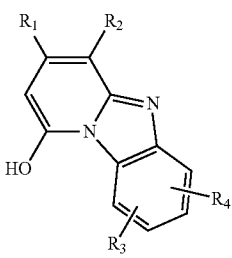
(8)

The diazotization of the compound represented by the general formula (1) is performed by a known method. For example, the compound is diazotized in an inorganic acid medium at −5 to 30° C., preferably 0 to 15° C. with a nitrite. A nitrite of an alkali metal such as sodium nitrite can be used as the nitrite. The coupling reaction between the diazotized product of the compound represented by the general formula (1) and the compound represented by the general formula (2) is also performed by a known method. For example, the coupling reaction is performed in water or an aqueous organic medium at −5 to 30° C., preferably 0 to 25° C. and at an acidic to neutral pH value, preferably a pH of 1 to 6. The diazotized reaction liquid is acidic. In addition, the diazotized reaction liquid further acidifies because the coupling reaction proceeds. Therefore, the pH of the reaction liquid is adjusted to a preferred value by adding a base. A hydroxide of an alkali metal such as lithium hydroxide, sodium hydroxide, or potassium hydroxide, a carbonate of an alkali metal such as lithium carbonate, sodium carbonate, or potassium carbonate, an acetate of an alkali metal such as sodium acetate, ammonia, an organic amine, or the like can be used as the base. In addition, the compound represented by the general formula (1) and the compound represented by the general formula (2) have only to be used in substantially stoichiometric amounts.

The diazotization of the compound represented by the general formula (3) is performed by a known method. For example, the compound is diazotized in an inorganic acid medium at −5 to 40° C., preferably 5 to 30° C. with a nitrite. The coupling between the diazotized product of the compound represented by the general formula (3) and the compound represented by the general formula (4) is also performed by a known method. The coupling reaction is performed in water or an aqueous organic medium at −5 to 40° C., preferably 10 to 30° C. and at an acidic to neutral pH value, preferably a pH of 2 to 7. The diazotized reaction liquid is acidic. In addition, the diazotized reaction liquid further acidifies because the coupling reaction proceeds. Therefore, the pH of the reaction liquid is adjusted to a preferred value by adding a base. The same base as described above can be used as the base. In addition, the compound represented by the general formula (3) and the compound represented by the general formula (4) have only to be used in substantially stoichiometric amounts.

The diazotization of the compound represented by the general formula (5) is performed by a known method. For example, the compound is diazotized in an inorganic acid medium at −5 to 50° C., preferably 5 to 40° C. with a nitrite. The coupling between the diazotized product of the compound represented by the general formula (5) and the compound represented by the general formula (6) is also performed by a known method. The coupling reaction is performed in water or an aqueous organic medium at −5 to 50° C., preferably 10 to 40° C. and at an acidic to neutral pH value, preferably a pH of 2 to 7. The diazotized reaction liquid is acidic. In addition, the diazotized reaction liquid further acidifies because the coupling reaction proceeds. Therefore, the pH of the reaction liquid is adjusted to a preferred value by adding a base. The same base as described above can be used as the base. In addition, the compound represented by the general formula (5) and the compound represented by the general formula (6) have only to be used in substantially stoichiometric amounts.

The diazotization of the compound represented by the general formula (7) is performed by a known method. For example, the compound is diazotized in an inorganic acid medium at −5 to 50° C., preferably 10 to 40° C. with a nitrite. The coupling between the diazotized product of the compound represented by the general formula (7) and the compound represented by the general formula (8) is also performed by a known method. The coupling reaction is performed in water or an aqueous organic medium at −5 to 50° C., preferably 10 to 40° C. and at a weakly acidic to alkaline pH value, preferably a pH of 5 to 10. The diazotized reaction liquid is acidic. In addition, the diazotized reaction liquid further acidifies because the coupling reaction proceeds. Therefore, the pH of the reaction liquid is adjusted to a preferred value by adding a base. The same base as described above can be used as the base. In addition, the compound represented by the general formula (7) and the compound represented by the general formula (8) have only to be used in substantially stoichiometric amounts.

A salt of the compound represented by the general formula (I) is a salt of the compound represented by the general formula (I) and an inorganic or organic cation. Specific examples of the inorganic salt can include an alkali metal salt, an alkaline earth metal salt, and an ammonium salt. Of those, lithium, sodium, potassium, and ammonium salts are preferred. In addition, for example, a salt with a quaternary ammonium ion represented by the following general formula (9) can be given as a specific example of the organic salt. In addition, the compound represented by the general formula (I) may be a mixture containing a free acid of the compound represented by the general formula (I), a tautomer thereof, and various salts thereof. Specifically, they can be any one of the following combinations: a mixture of a sodium salt and an ammonium salt, a mixture of a free acid and a sodium salt, and a mixture of a lithium salt, a sodium salt, and an ammonium salt. The physical properties of the salt such as solubility may vary depending on its kind. Accordingly, a mixture having physical properties adequate for a purpose can be obtained by appropriately selecting the kind of the salt, or by changing their ratios when the mixture contains, for example, multiple salts, as required.

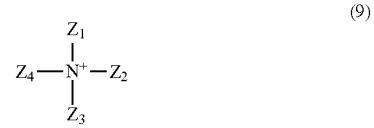

(9)

In the general formula (9), $Z_1$ to $Z_4$ each independently represent a group selected from the group consisting of a hydrogen atom, an unsubstituted alkyl group, a hydroxyalkyl group, and a hydroxyalkoxyalkyl group, provided that at least one of $Z_1$ to $Z_4$ represents a group except a hydrogen atom.

In the general formula (9), specific examples of the unsubstituted alkyl group represented by any one of $Z_1$ to $Z_4$ may include unsubstituted alkyl groups having 1 to 4 carbon atoms such as methyl, ethyl, n-propyl, isopropyl, n-butyl, isobutyl, sec-butyl, and tert-butyl groups. Specific examples of the hydroxyalkyl group can include hydroxyalkyl groups having 1 to 4 carbon atoms such as hydroxymethyl, hydroxyethyl, 3-hydroxypropyl, 2-hydroxypropyl, 4-hydroxybutyl, 3-hydroxybutyl, and 2-hydroxybutyl groups. In addition, specific examples of the hydroxyalkoxyalkyl group can include hydroxyalkoxyalkyl groups (whose alkoxys and alkyls each have 1 to 4 carbon atoms) such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl groups. Of those, a hydroxyethoxyalkyl group (whose alkyl has 1 to 4 carbon atoms) is preferred.

It is preferred that $Z_1$ to $Z_4$ in the general formula (9) each independently represent a hydrogen atom (provided that at least one of $Z_1$ to $Z_4$ represents a group except a hydrogen atom); a methyl; a hydroxyalkyl group having 1 to 4 carbon atoms such as a hydroxymethyl, hydroxyethyl, 3-hydroxypropyl, 2-hydroxypropyl, 4-hydroxybutyl, 3-hydroxybutyl, or 2-hydroxybutyl group; or a hydroxyethoxyalkyl group (whose alkyl has 1 to 4 carbon atoms) such as a hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, or 2-hydroxyethoxybutyl group.

Suitable specific examples of the quaternary ammonium ion represented by the general formula (9) can include Exemplified Compounds a to 1 shown in Table 2.

TABLE 2

Exemplified compounds of general formula (9)

| Exemplified Compound | $Z_1$ | $Z_2$ | $Z_3$ | $Z_4$ |
|---|---|---|---|---|
| a | H | $CH_3$ | $CH_3$ | $CH_3$ |
| b | $CH_3$ | $CH_3$ | $CH_3$ | $CH_3$ |
| c | H | $C_2H_4OH$ | $C_2H_4OH$ | $C_2H_4OH$ |
| d | $CH_3$ | $C_2H_4OH$ | $C_2H_4OH$ | $C_2H_4OH$ |
| e | H | $CH_2CH(OH)CH_3$ | $CH_2CH(OH)CH_3$ | $CH_2CH(OH)CH_3$ |
| f | $CH_3$ | $CH_2CH(OH)CH_3$ | $CH_2CH(OH)CH_3$ | $CH_2CH(OH)CH_3$ |
| g | H | $C_2H_4OH$ | H | $C_2H_4OH$ |
| h | $CH_3$ | $C_2H_4OH$ | H | $C_2H_4OH$ |
| i | H | $CH_2CH(OH)CH_3$ | H | $CH_2CH(OH)CH_3$ |
| j | $CH_3$ | $CH_2CH(OH)CH_3$ | H | $CH_2CH(OH)CH_3$ |
| k | $CH_3$ | $C_2H_4OH$ | $CH_3$ | $C_2H_4OH$ |
| l | $CH_3$ | $CH_2CH(OH)CH_3$ | $CH_3$ | $CH_2CH(OH)CH_3$ |

For example, the following methods (a) and (b) can each be given as a method of synthesizing the salt of the compound represented by the general formula (I). The target salt of the compound represented by the general formula (I) can be obtained in the state of a solution or a precipitated solid by any such method as described below.

(a) After the completion of the final step in the reaction for the synthesis of the compound represented by the general formula (I), an inorganic salt or a quaternary ammonium salt is added to the reaction liquid to perform salting-out.

(b) The free acid of the azo compound isolated by adding a mineral acid such as hydrochloric acid to the reaction liquid is washed with, for example, water, acidic water, or an aqueous organic medium as required, and then an adhering impurity such as an inorganic salt is removed. A desired inorganic base or an organic base corresponding to the quaternary ammonium salt is added to the free acid again in an aqueous medium (preferably in water).

It should be noted that the term "acidic water" refers to water that has been made acidic by dissolving therein, for example, a mineral acid such as sulfuric acid or hydrochloric acid, or an organic acid such as acetic acid. In addition, the term "aqueous organic medium" refers to a mixture of an organic compound miscible with water and water. A water-soluble organic solvent to be described later can be given as a specific example of the "organic compound miscible with water."

Specific examples of the inorganic salt to be used when the azo compound represented by the general formula (I) is turned into a desired salt may include: a halide of an alkali metal such as lithium chloride, sodium chloride, or potassium chloride; a carbonate of an alkali metal such as lithium carbonate, sodium carbonate, or potassium carbonate; a hydroxide of an alkali metal such as lithium hydroxide, sodium hydroxide, or potassium hydroxide; an ammonium halide such as ammonium chloride or ammonium bromide; and ammonium hydroxide (ammonia water). In addition, specific examples of the salt of an organic cation may include halide salts of the quaternary ammonium ion represented by the general formula (9) such as diethanolamine hydrochloride and triethanolamine hydrochloride.

In the present invention, it is preferred that the compound represented by the general formula (I) have anionic groups and the proportion of anionic groups of a lithium salt form to the anionic groups be set within a specific range. The ratio is calculated from the expression "(m/n)×100" where n (n≠0) represents the number of the anionic groups in the compound represented by the general formula (I) and m (n≥m) represents the number of the anionic groups of the lithium salt form. When it is difficult to know the values n and m for one molecule of the compound represented by the general formula (I), the ratio may be calculated from the values m and n, which are determined as values per unit mass or unit volume of the ink, for convenience. It should be noted that when the compound represented by the general formula (I) is a mixed salt of a lithium salt and another salt, such another salt is preferably a sodium salt from the viewpoint of solubility.

When the proportion of the anionic groups of a lithium salt form to the anionic groups is set to 70.0% or more, the association of the compound represented by the general formula (I) in the ink is suppressed in an additionally effective manner, and hence an image having an extremely high level of humidity resistance can be recorded. Further, when the proportion of the anionic groups of a lithium salt form to the anionic groups is set to 90.0% or less, an image having good color rendering properties of light sources can be recorded. Here, the phrase "good color rendering properties of light sources" means that the color of the image does not change even when different light sources are used. In contrast, for example, the color of an image under sunlight and that of the same image under a fluorescent lamp appear to be different from each other when its color rendering properties of light sources is poor.

Here, when an ink has absorption over a wide range of the visible region, an image having good color rendering properties of light sources can be recorded. Therefore, a coloring material capable of imparting such characteristic is preferably incorporated into the ink. The compound represented by the general formula (I) in which the proportion of the anionic groups of a lithium salt form is more than 90.0% has strong absorption in a long wavelength region (around 600 nm) but its absorption in a short wavelength region (400 to 500 nm) is weak. In contrast, the compound represented by the general formula (I) in which the proportion of the anionic groups of a lithium salt form is 90.0% or less has a broader absorption peak than that of the compound in which the ratio is more than 90.0%, and its absorption in the short wavelength region increases.

The inventors of the present invention have assumed the reason why such phenomenon occurs to be as described below. The molecules of the compound represented by the general formula (I) easily associate with each other when an ion except the lithium ion is present as a counter ion for an anionic group. The association of the molecules results in conjugation between the molecules of the compound represented by the general formula (I). The conjugation between the molecules broadens the absorption peak of the compound represented by the general formula (I) and strengthens its absorption in the short wavelength region. As a result, the compound has absorption over an additionally wide range of the visible region, and hence an ink capable of recording an image whose color change due to a difference in light source has been suppressed is obtained.

Verification Method of Coloring Material

In order to verify whether the coloring material (compound represented by the general formula (I)) used in the present invention is contained in the ink or not, the following verification methods (1) to (3) using high performance liquid chromatography (HPLC) can be applied.

(1) Retention time of a peak
(2) Maximum absorption wavelength for the peak in (1)
(3) M/Z (posi) and M/Z (nega) of a mass spectrum for the peak in (1)

The analysis conditions of high performance liquid chromatography are as described below. A liquid (ink) diluted with pure water about 1,000-fold is used as a sample for measurement. Then, analysis by high performance liquid chromatography is performed under the following conditions to measure the retention time of a peak and the maximum absorption wavelength for the peak.

Column: SunFire C18 (manufactured by Nihon Waters K. K.) 2.1 mm×150 mm
Column temperature: 40° C.
Flow rate: 0.2 mL/min
PDA: 200 nm to 700 nm
Mobile phases and gradient conditions: Table 3

TABLE 3

| Mobile phases and gradient conditions | | | | |
|---|---|---|---|---|
| | 0 to 5 minutes | 5 to 24 minutes | 24 to 31 minutes | 31 to 45 minutes |
| A: Water | 90% | 90→45% | 45→0% | 0% |
| B: Methanol | 5% | 5→50% | 50→95% | 95% |
| C: 0.2-mol/L aqueous solution of ammonium acetate | 5% | 5% | 5% | 5% |

In addition, conditions for the analysis of the mass spectrum are as described below. The mass spectrum for the resultant peak is measured under the following conditions, and then the most strongly detected M/Z is measured for each of 'posi' and 'nega'.

Ionization method: ESI
Capillary voltage: 3.5 kV
Desolvation gas: 300° C.
Ion source temperature: 120° C.

Detectors:
posi; 40V 200 to 1,500 amu/0.9 sec
nega; 40V 200 to 1,500 amu/0.9 sec Exemplified Compound 7 as a specific example of the compound represented by the general formula (I) was subjected to the measurement by the method and under the conditions. Table 4 shows values for the retention time, maximum absorption wavelength, M/Z (posi), and M/Z (nega) obtained as a result of the measurement. When an unknown ink is subjected to the measurement by the same method and under the same conditions as the foregoing, and the resultant measured values correspond to the values shown in Table 4, the ink can be judged to contain the compound represented by the general formula (I) to be used in the ink of the present invention.

TABLE 4

| Results of measurement | | | |
|---|---|---|---|
| Retention time | Maximum absorption wavelength | M/Z | |
| [minute(s)] | [nm] | posi | nega |
| Exemplified Compound 7 | | | |
| 30.0 to 34.0 | 585 to 605 | 1,437 to 1,440 | 1,435 to 1,438 |

(Other Coloring Materials)

The ink of the present invention preferably further contains at least one compound selected from the group consisting of a compound represented by the following general formula (VI) and a compound represented by the following general formula (VII) as another coloring material. The inventors of the present invention have found that the incorporation of such coloring material can suppress a reduction in color balance of an image due to an ozone gas while maintaining the humidity resistance of the image.

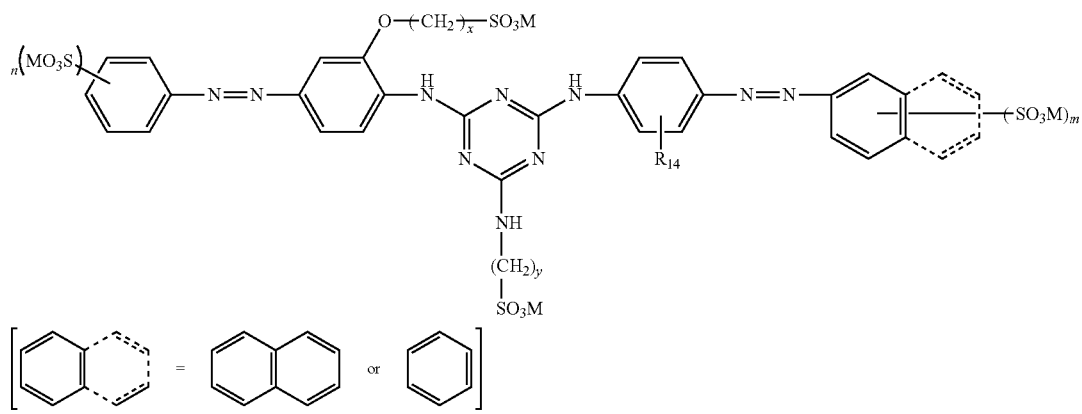

(VI)

In the general formula (VI), $R_{14}$ represents a hydrogen atom, an alkyl group having 1 to 4 carbon atoms, an alkoxy group having 1 to 4 carbon atoms, or a sulfonic group, n represents an integer of 1 or 2, m represents an integer of 1 to 3, x represents an integer of 2 to 4, y represents an integer of 1 to 3, and M's each independently represent a hydrogen atom, an alkali metal, ammonium, or an organic ammonium. The sulfonic group represented by $R_{14}$ may be of a salt form and the same examples as those exemplified for M's can each be given as a cation that forms a salt.

pound represented by the general formula (I))/(the total content of the compounds represented by the general formulae (VI) and (VII))" is preferably 0.5 time or more and 30.0 times or less. The mass ratio is more preferably 0.5 time or more and 10.0 times or less, particularly preferably 0.5 time or more and 2.0 times or less.

(VII)

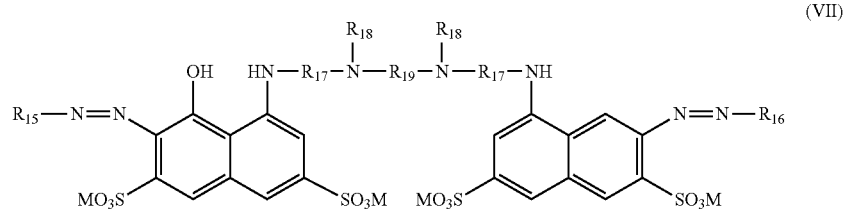

In the general formula (VII), $R_{15}$ and $R_{16}$ each independently represent an aryl group, and at least one of $R_{15}$ and $R_{16}$ has at least one kind of substituent selected from the group consisting of a carboxy group and a sulfonic group, $R_{17}$'s each independently represent 1,3,5-triazine or a derivative thereof, $R_{18}$'s each independently represent a hydrogen atom, a substituted or unsubstituted alkyl group, a substituted or unsubstituted alkenyl group, a substituted or unsubstituted aralkyl group, or an atomic group that forms a perhydroxyazine ring together with a nitrogen atom, $R_{19}$ represents a divalent organic linking group, and M's each independently represent a hydrogen atom, an alkali metal, ammonium, or an organic ammonium. The carboxy group or sulfonic group which at least one of $R_{15}$ and $R_{16}$ can have as a substituent may be of a salt form, and the same examples as those exemplified for M's can each be given as a cation that forms a salt.

(Content of Coloring Material)

The content (% by mass) of the compound represented by the general formula (I) in the ink is preferably 0.1% by mass or more and 10.0% by mass or less, more preferably 0.2% by mass or more and 2.0% by mass or less based on the total mass of the ink. In addition, when the ink contains at least one of the compounds represented by the general formulae (VI) and (VII) as another coloring material, the (total) content (% by mass) of the other coloring material is preferably 0.1% by mass or more and 2.0% by mass or less based on the total mass of the ink. The content (% by mass) of each of the compounds represented by the general formulae (VI) and (VII) in the ink is preferably 0.05% by mass or more and 1.5% by mass or less based on the total mass of the ink. Further, the total content (% by mass) of the coloring materials in the ink is preferably 0.3% by mass or more and 8.0% by mass or less, more preferably 0.3% by mass or more and 4.0% by mass or less.

As described in the foregoing, in order that an ink capable of recording an image in which a reduction in color balance due to an ozone gas is suppressed while humidity resistance is maintained can be obtained, at least one of the compounds represented by the general formulae (VI) and (VII) is preferably further incorporated as a coloring material. In order that such effect is obtained at a high level, a mass ratio among those compounds is preferably set as described below. Specifically, the content (% by mass) of the compound represented by the general formula (I) based on the total mass of the ink is preferably 0.5 time or more and 30.0 times or less in terms of mass ratio with respect to the total content (% by mass) of the compounds represented by the general formulae (VI) and (VII). That is, the ratio "(the content of the com- Aqueous Medium An aqueous solvent that is water or a mixed solvent of water and a water-soluble organic solvent may be used in the ink according to the present invention. Deionized water (ion-exchanged water) is favorably used as the water. The content (% by mass) of water in the ink is favorably 10.0% by mass or more and 90.0% by mass or less based on the total mass of the ink.

No particular limitation is imposed on the water-soluble organic solvent so far as the solvent is soluble in water, alcohols, polyglycols, glycol ethers, nitrogen-containing polar solvents and sulfur-containing polar solvents may be used. The content (% by mass) of the water-soluble organic solvent in the ink is favorably 5.0% by mass or more and 90.0% by mass or less, more favorably 10.0% by mass or more and 50.0% by mass or less, based on the total mass of the ink. Incidentally, the range of the content of the water-soluble organic solvent is a value including the alkanediol having 4 to 6 carbon atoms and bis(2-hydroxyethyl) sulfone usable as needed. If the content of the water-soluble organic solvent is below or beyond the above-described range, the ejection stability of the resulting ink may not be sufficiently achieved at a high level in some cases.

Other Additives

The ink according to the present invention may contain a water-soluble organic compound which is solid at ordinary temperature, such as a polyhydric alcohol such as trimethylolpropane or trimethylolethane, urea, or a urea derivative such as ethyleneurea, in addition to the above-described components as needed. In addition, the ink according to the present invention may also contain various additives such as a surfactant, a pH adjustor, a rust preventive, a preservative, a mildewproofing agent, an antioxidant, an anti-reducing agent, an evaporation accelerator, a chelating agent and a water-soluble polymer as needed.

Other Inks

In order to record a full-color image, the ink according to the present invention may be used in combination with other inks having a hue different from the ink according to the present invention. As examples of the other inks, may be mentioned at least one ink selected from the group consisting of black, cyan, magenta, yellow, red, green and blue inks. What is called a light color ink having substantially the same hue as such an ink may also be further used in combination. Coloring materials used in the other inks and light color ink may be publicly known dyes or newly synthesized dyes.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
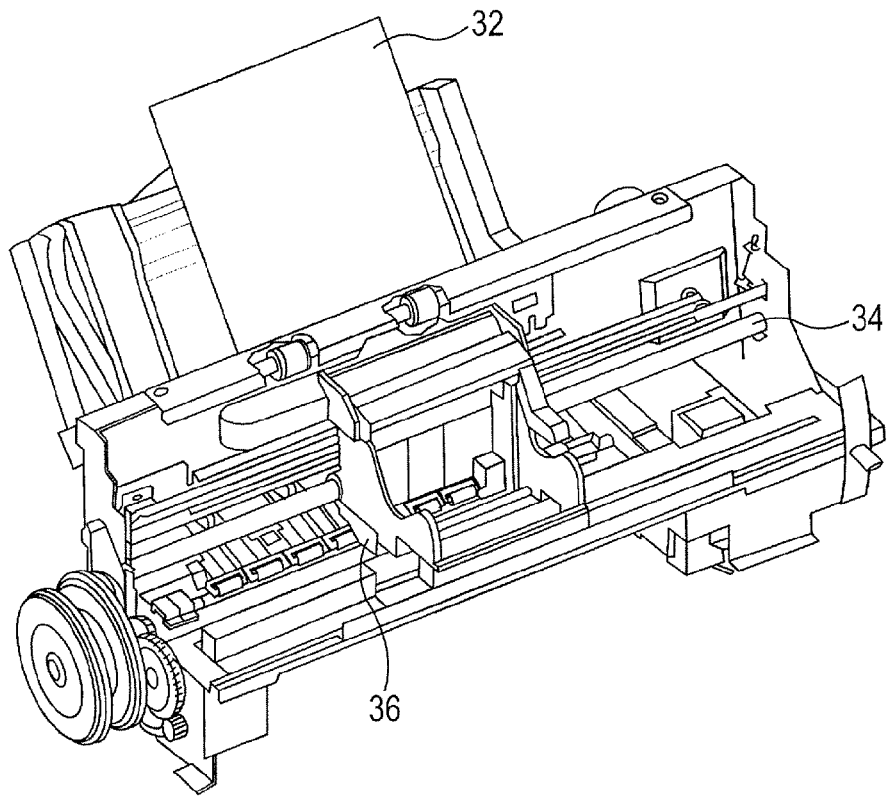
Figure 2B:
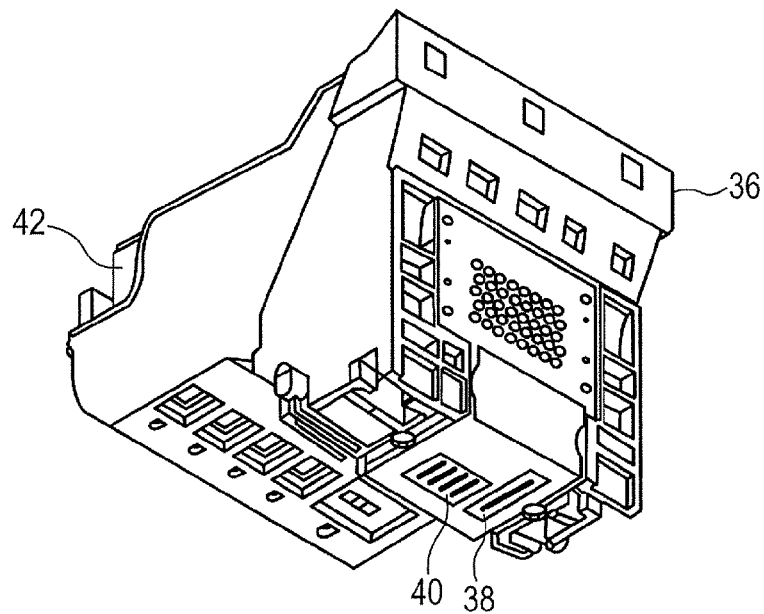

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components described below are based on mass unless expressly noted.

<Synthesis of Coloring Material>

Each coloring material was synthesized according to the following procedures. The maximum absorption wavelength ($\lambda_{max}$) of the absorption spectrum of the resultant coloring material was measured by using water as a solvet under the following conditions.

Spectrophotometer: automatic recording spectrophotometer (trade name: "U-3300," manufactured by Hitachi, Ltd.)
Measurement cell: 1 cm quartz cell
Sampling interval: 0.1 nm
Scanning speed: 30 nm/min (Synthesis of Compound A)

(a)

51.8 Parts of 4-chloro-3-nitroaniline was dissolved in 60.0 parts of N-methyl-2-pyrrolidone and then 35.2 parts of acetic anhydride was dropped to the solution over about 15 minutes. The mixture was subjected to a reaction at 40 to 50° C. for 2 hours and then the reaction liquid was added to 400.0 parts of water. The mixture was stirred at room temperature for 30 minutes and then the precipitated solid was filtered. The resultant solid was washed with 100.0 parts of water, and was then separated and dried to provide 63.0 parts of a compound represented by the following formula (10).

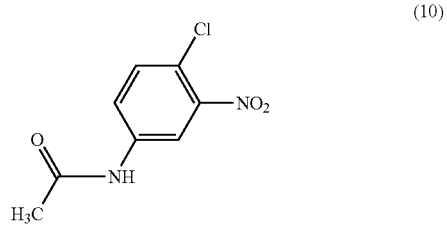

(10)

(b)

42.9 Parts of the compound represented by the formula (10) obtained in the procedure (a) was dissolved in 115.0 parts of N-methyl-2-pyrrolidone, and then 40.9 parts of sodium 3-mercaptopropanesulfonate and 29.0 parts of potassium carbonate were added to the solution. After that, the mixture was heated to 130 to 140° C. and then subjected to a reaction at the temperature for 2 hours. 3.6 Parts of sodium 3-mercaptopropanesulfonate was further added to the resultant and then the mixture was subjected to a reaction at 130 to 140° C. for 1 hour. After having been cooled to 60° C., the reaction liquid was added to 700.0 parts of 2-propanol and then the mixture was cooled to room temperature. The produced solid was separated by filtration to provide a wet cake. The resultant wet cake was dissolved in 300.0 parts of water and then 35% hydrochloric acid was added to the solution to adjust its pH to 3.0 to 4.0. After that, sodium chloride was added to the solution to perform salting-out. The precipitated solid was separated by filtration to provide 205.3 parts of the wet cake of a compound represented by the following formula (11).

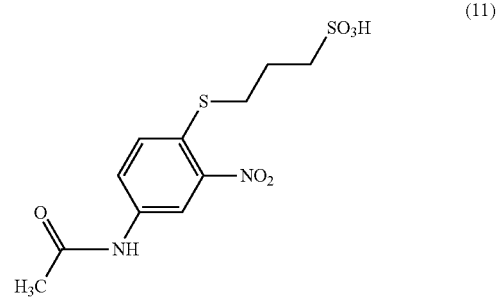 [SMILES: CC(=O)Nc1ccc(SCCCS(=O)(=O)O)c([N+](=O)[O-])c1]

(11)

(c)

102.6 Parts of the wet cake of the compound represented by the formula (11) obtained in the procedure (b), 1.6 parts of activated carbon, and 0.4 part of anhydrous iron(III) chloride were added to 150.0 parts of water, and then the mixture was heated to 60° C. After that, 15.9 parts of 80% hydrazine hydrate was dropped to the mixture over about 30 minutes. The mixture was heated to 90° C. and then subjected to a reaction at the temperature for 1.5 hours. After the resultant had been cooled to 40° C., the insoluble matter was removed by filtration and then the filtrate was cooled to room temperature. 50% sulfuric acid was added to the filtrate to adjust its pH to 1.0 to 1.5. The precipitated solid was separated by filtration to provide 62.3 parts of the wet cake of a compound represented by the following formula (12).

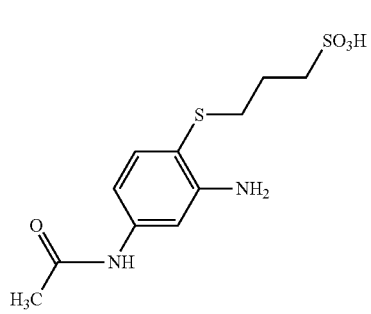

(d)
12.6 Parts of 5-amino-2-chlorobenzenesulfonic acid represented by the following formula (13) was added to 40.0 parts of water and then a 25% aqueous solution of sodium hydroxide was added to the mixture to provide an aqueous solution having a pH of 4.0 to 5.0. 25.0 Parts of 35% hydrochloric acid was added to the resultant aqueous solution and then 12.6 parts of a 40% aqueous solution of sodium nitrite was added to the mixture, followed by a reaction for about 30 minutes. 1.5 Parts of sulfamic acid was added to the resultant and then the mixture was stirred for 5 minutes to provide a diazotized reaction liquid. Meanwhile, 32.4 parts of the wet cake of the compound represented by the formula (12) obtained in the procedure (c) was added to 200.0 parts of water and then a 25% aqueous solution of sodium hydroxide was added to the mixture to provide an aqueous solution having a pH of 4.0 to 5.0. The resultant aqueous solution was dropped to the diazotized reaction liquid over about 5 minutes. After the dropping, the mixture was subjected to a reaction for 3 hours while its pH was held at 2.0 to 2.5 by adding a 15% aqueous solution of sodium carbonate. After that, sodium chloride was added to the solution to perform salting-out. The precipitated solid was separated by filtration to provide 31.5 parts of the wet cake of a compound represented by the following formula (14).

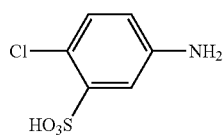

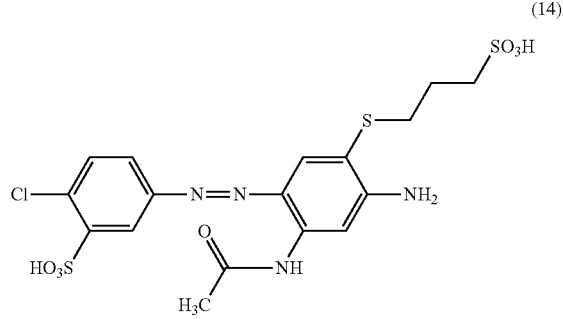

(e)
The entirety of the wet cake of the compound represented by the formula (14) obtained in the procedure (d) was added to 40.0 parts of water, and then a 25% aqueous solution of sodium hydroxide was added to the mixture to provide an aqueous solution having a pH of 6.0 to 7.0. 24.8 Parts of 35% hydrochloric acid was added to the resultant and then 9.8 parts of a 40% aqueous solution of sodium nitrite was added to the mixture, followed by a reaction for about 30 minutes. 2.0 Parts of sulfamic acid was added to the resultant and then the mixture was stirred for 5 minutes to provide a diazotized reaction liquid. Meanwhile, 30.8 parts of the wet cake of the compound represented by the formula (12) obtained in the procedure (c) was added to 250.0 parts of water and then a 25% aqueous solution of sodium hydroxide was added to the mixture to provide an aqueous solution having a pH of 4.0 to 5.0. The aqueous solution was dropped to the diazotized reaction liquid over about 5 minutes. After the dropping, the mixture was subjected to a reaction for 3 hours while its pH was held at 2.0 to 2.5 by adding a 15% aqueous solution of sodium carbonate. After that, sodium chloride was added to the solution to perform salting-out. The precipitated solid was separated by filtration to provide 90.0 parts of the wet cake of a compound represented by the following formula (15).

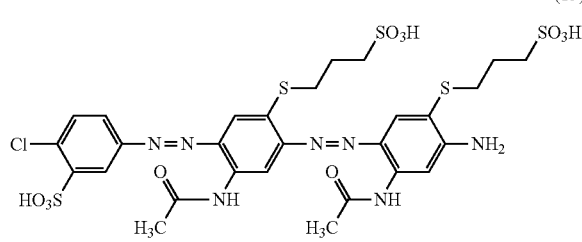

(f)
45.0 Parts of the wet cake of the compound represented by the formula (14) obtained in the procedure (d) was added to 250.0 parts of water and was then dissolved through stirring. 16.5 Parts of 35% hydrochloric acid was added to the solution and then 4.7 parts of a 40% aqueous solution of sodium nitrite was added to the mixture, followed by stirring for about 30 minutes. 2.0 Parts of sulfamic acid was added to the resultant and then the mixture was stirred for 5 minutes to provide a diazotized reaction liquid. Meanwhile, 5.5 parts of a compound represented by the following formula (16) was added to 60.0 parts of water and then a 25% aqueous solution of sodium hydroxide was added to the mixture to provide an aqueous solution having a pH of 4.5 to 5.5. The resultant aqueous solution was dropped to the diazotized reaction liquid over about 5 minutes. After the dropping, the mixture was subjected to a reaction for 3 hours while its pH was held at 2.0 to 3.0 by adding a 15% aqueous solution of sodium carbonate. A 15% aqueous solution of sodium carbonate was added to the resultant to adjust its pH to 4.5 and then 350.0 parts of methanol was added to the resultant. The precipitated solid was separated by filtration to provide 6.0 parts of the wet cake of a compound represented by the following formula (17).

aqueous solution of sodium carbonate was added to hold the pH of the reaction liquid at 7.5 to 8.5, and then the reaction liquid was subjected to a reaction for an additional two hours while the temperature and the pH were maintained. After that, sodium chloride was added to the resultant to perform salting-out. The precipitated solid was separated by filtration to provide 29.5 parts of a wet cake. The resultant wet cake was dissolved in 100.0 parts of water and then the pH of the

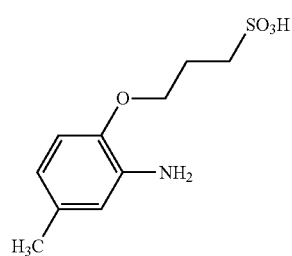

(16)

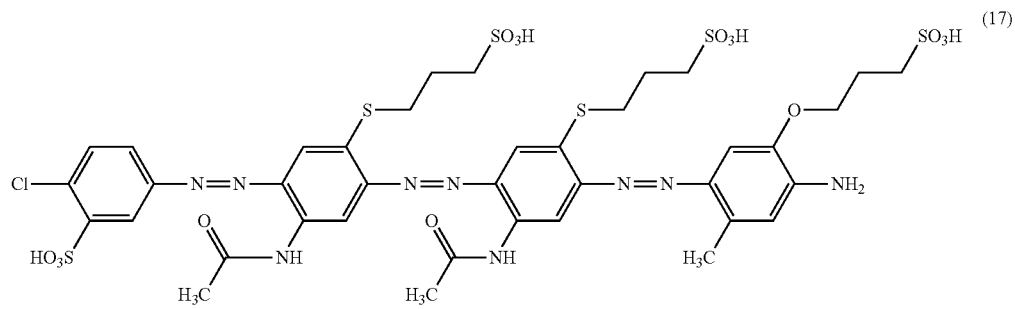

(17)

(g)

32.2 Parts of the wet cake of the compound represented by the formula (17) obtained in the procedure (f) was added to 170.0 parts of water and was then dissolved through stirring. 5.2 Parts of 35% hydrochloric acid was added to the solution and then 1.5 parts of a 40% aqueous solution of sodium nitrite was added to the mixture, followed by stirring for about 30 minutes. 1.0 Part of sulfamic acid was added to the resultant and then the mixture was stirred for 5 minutes to provide a diazotized reaction liquid. Meanwhile, 2.2 parts of a compound represented by the following formula (18) was added to 60.0 parts of water and then a 25% aqueous solution of sodium hydroxide was added to the mixture to provide an aqueous solution having a pH of 7.5 to 8.5. While the temperature of the resultant aqueous solution was kept at 15 to 30° C., the diazotized reaction liquid was dropped to the aqueous solution over about 30 minutes. At this time, an solution was adjusted to 7.0 to 7.5 with 35% hydrochloric acid. After that, 80.0 parts of methanol was added to the solution and then the precipitated solid was separated by filtration. The resultant wet cake was dissolved in 60.0 parts of water again and then 90.0 parts of methanol was added to the solution. The precipitated solid was separated by filtration and dried to provide 6.3 parts of a compound (compound A) represented by the following formula (19) as a sodium salt. The maximum absorption wavelength $\lambda_{max}$ of the absorption spectrum of the compound A was 589 nm. The proportion of anionic groups of a lithium salt form to the anionic groups of the compound A was 0.0% and the proportion of anionic groups of a sodium salt form to the anionic groups was 100.0%.

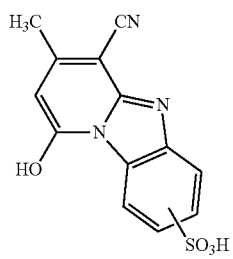

(18)

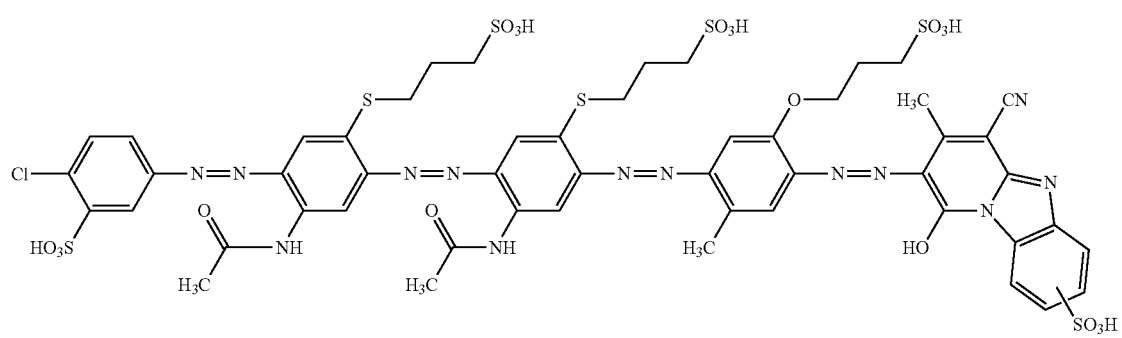

(Synthesis of Compound B)

(h)

15.2 Parts of 2-methyl-6-nitroaniline was dissolved in 300.0 parts of methanol. The resultant solution was transferred to the inside of an autoclave. 2.0 Parts of 5% Pd/carbon was added to the solution, and then the mixture was subjected to a reaction at 20 to 30° C. under pressure in a hydrogen atmosphere having a pressure of 0.2 to 0.5 MPa until the absorption of hydrogen ceased. The mixture was subjected to a reaction at the temperature for an additional thirty minutes. The catalyst (5% Pd/carbon) was separated by filtration. Thus, a solution (filtrate) containing a compound represented by the following formula (20) was obtained.

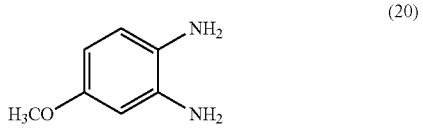

(20)

(i)

13.0 Parts of methyl cyanoacetate was added to 200.0 parts of the solution containing the compound represented by the formula (20) obtained in the procedure (h) and then the mixture was refluxed for 30 minutes. The resultant was concentrated by distilling methanol off under reduced pressure, and then 100.0 parts of water and sodium carbonate were added to the concentrate to adjust its pH to 7.0 to 7.5. The precipitated solid was separated by filtration and then dried to provide 8.3 parts of a compound represented by the following formula (21).

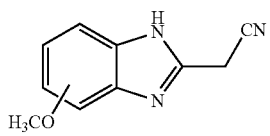

(21)

(j)

8.3 Parts of the compound represented by the formula (21) obtained in the procedure (i), 12.0 parts of 28% sodium methoxide, and 7.2 parts of methyl acetoacetate were added to 100.0 parts of ethanol, and then the mixture was refluxed for 30 minutes. The resultant was concentrated by distilling ethanol off under reduced pressure, and then 100.0 parts of water and 35% hydrochloric acid were added to the concentrate to adjust its pH to 7.0 to 7.5. The precipitated solid was separated by filtration and then dried to provide 11.1 parts of a compound represented by the following formula (22). The resultant compound represented by the following formula (22) was a mixture of a compound substituted with a methoxy group at b and a compound substituted with the group at c.

(22)

(k)

5.6 Parts of the compound represented by the formula (22) obtained in the procedure (j) was slowly added to 77.0 parts of 8% fuming sulfuric acid at 5 to 10° C. and then the mixture was subjected to a reaction at the temperature for 1.5 hours. The reaction liquid was dropped to 150.0 parts of ice water over about 10 minutes and then the mixture was stirred at 65 to 70° C. for 30 minutes. After that, the precipitated solid was separated by filtration to provide 24.4 parts of the wet cake of a compound represented by the following formula (23). The resultant compound represented by the following formula (23) was a mixture of (i) a compound substituted with a methoxy group at b and being substituted with a sulfonic group at a, c, or d, and (ii) a compound substituted with the methoxy group at c and being substituted with the sulfonic group at a, b, or d.

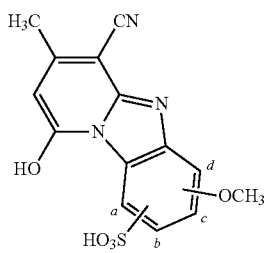
(23)

(1)
6.3 Parts of a compound (compound B) represented by the following formula (24) was obtained as a sodium salt in the same manner as in the case of the procedure (g) of the "synthesis of compound A" except that 7.2 parts of the wet cake of the compound represented by the formula (23) obtained in the procedure (k) was used instead of 2.2 parts of the compound represented by the formula (18). The resultant compound represented by the following formula (24) was a mixture formed of 2 to 6 kinds of compounds including (A) a compound substituted with a methoxy group at b and being substituted with a sulfonic group at a, c, or d, and (B) a compound substituted with the methoxy group at c and being substituted with the sulfonic group at a, b, or d. In addition, the maximum absorption wavelength $\lambda_{max}$ of the absorption spectrum of the compound B was 592 nm. The proportion of anionic groups of a lithium salt form to the anionic groups of the compound B was 0.0% and the proportion of anionic groups of a sodium salt form to the anionic groups was 100.0%.

use amount of lithium chloride in the following operations. After each of the synthesized compounds C to G had been subjected to a desalting treatment by a known method, the proportion of its lithium salt was determined by determining the content of the lithium ion through ion chromatography.

The compound B represented by the formula (24) obtained in the procedure (l) and lithium chloride were added to water, and then the mixture was stirred. 2-Propanol was further added to the mixture and then the precipitated solid was separated by filtration to provide a wet cake. The resultant wet cake and lithium chloride were added to water, and then the mixture was stirred. 2-Propanol was further added to the mixture and then the precipitated solid was separated by filtration to provide a wet cake. The resultant wet cake was added to water and then 2-propanol was further added to the mixture. The precipitated solid was separated by filtration to provide a wet cake. The resultant wet cake was added to water and then 2-propanol was further added to the mixture. The precipitated solid was separated by filtration and then dried to provide each of the compounds C to G.

The proportion of anionic groups of a lithium salt form to the anionic groups of each of the compounds C to G and the proportion of anionic groups of a sodium salt form to the anionic groups were as described below.

Compound C: 60.0% of lithium salt form, 40.0% of sodium salt form

Compound D: 70.0% of lithium salt form, 30.0% of sodium salt form

Compound E: 80.0% of lithium salt form, 20.0% of sodium salt form

Compound F: 90.0% of lithium salt form, 10.0% of sodium salt form

Compound G: 100.0% of lithium salt form

<Preparation of Other Coloring Materials>

Compounds H and I represented by the following formulae (25) and (26) as free acid forms were used as other coloring

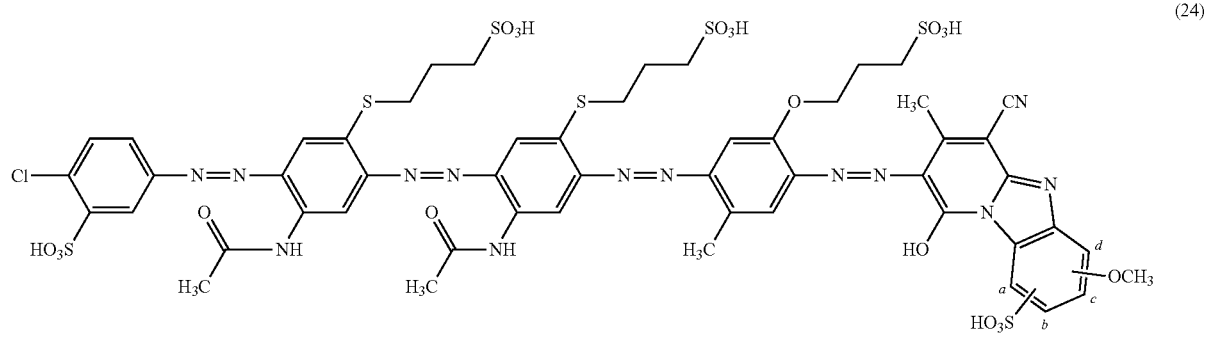
(24)

(Synthesis of Compounds C to G)

Compounds C to G different from one another in proportion of a counter ion for an anionic group were each synthesized by subjecting the compound B represented by the formula (24) obtained in the procedure (l) to ion exchange. It should be noted that the proportion of the anionic groups of a lithium salt form to the anionic groups of the compound B was 0.0% and the proportion of the anionic groups of a sodium salt form to the groups was 100.0%. Specifically, the proportion of converting a sodium ion as a counter ion for an anionic group to a lithium ion was adjusted by changing the materials (dyes). The compound H represented by the following formula (25) is a specific example of the compound represented by the general formula (VI). In addition, the compound I represented by the following formula (26) is a specific example of the compound represented by the general formula (VII). It should be noted that C.I. Direct Violet 107 is also a specific example of the compound represented by the general formula (VII). The pH's of those compounds H and I was adjusted with an aqueous solution of sodium hydroxide to turn an anionic group into a sodium salt form before the compounds were used in ink preparation.

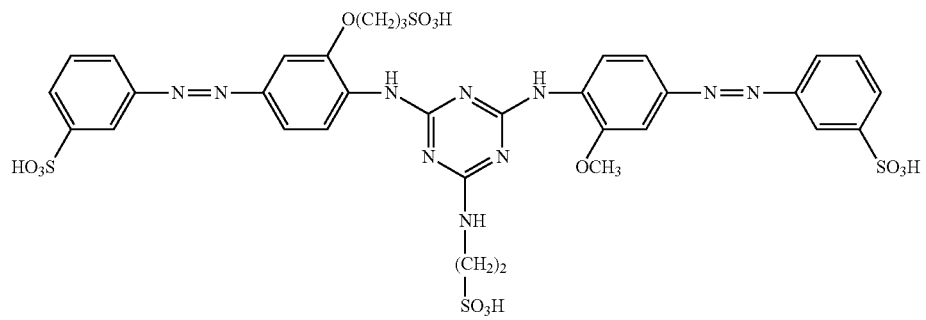

(25)

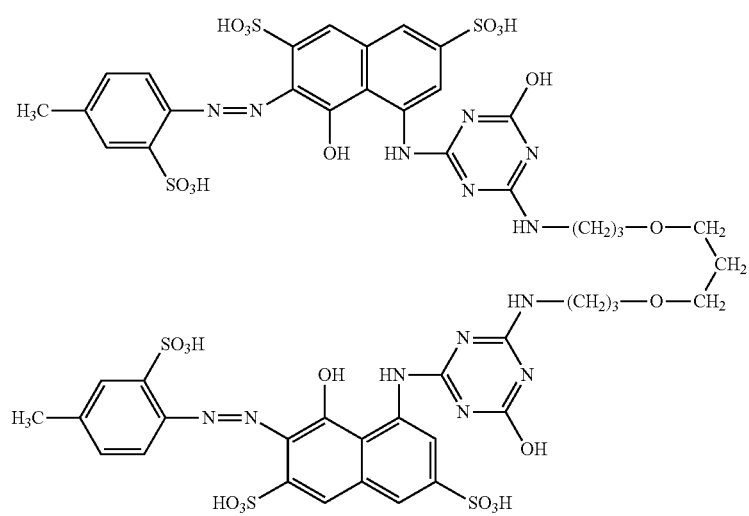

(26)

Comparative compounds A to E represented by the following formulae (27) to (31) as free acid forms were used as comparative compounds (dyes) of the compound represented by the general formula (I). These comparative compounds A to E were used after conducting the following procedures. The pH's of those comparative compounds A to E were adjusted with an aqueous solution of lithium hydroxide to turn anionic groups into a sodium salt form, and then lithium chloride was added to the mixture and the mixture was stirred. 2-Propanol was further added to the mixture and then the precipitated solid was separated by filtration to provide a wet cake. The resultant wet cake and lithium chloride were added to water, and then the mixture was stirred. 2-Propanol was further added to the mixture and then the precipitated solid was separated by filtration to provide a wet cake. The resultant wet cake was added to water and then 2-propanol was further added to the mixture. The precipitated solid was separated by filtration to provide a wet cake. The resultant wet cake was added to water and then 2-propanol was further added to the mixture. The precipitated solid was separated by filtration and then dried to provide each of the comparative compounds A to E each having anionic groups which were converted into a lithium salt form and a sodium salt form (molar ratio=80:20) before the comparative compounds were used in ink preparation.

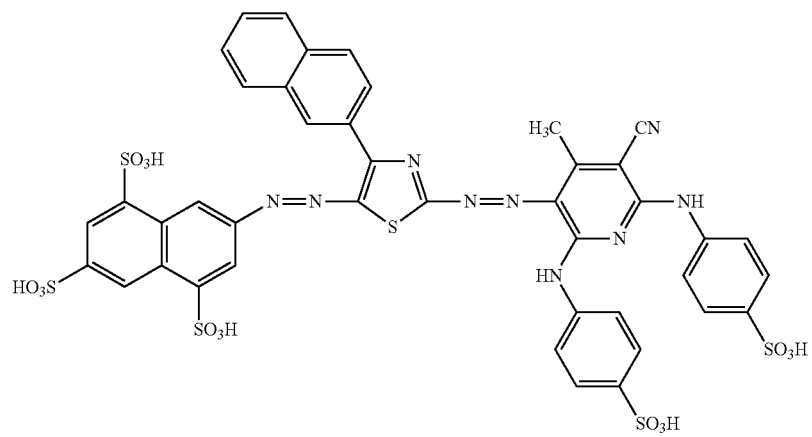
(27)
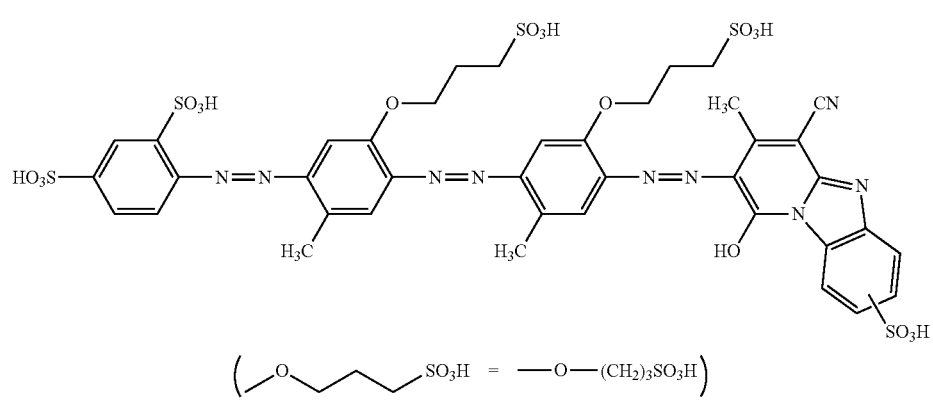
(28)
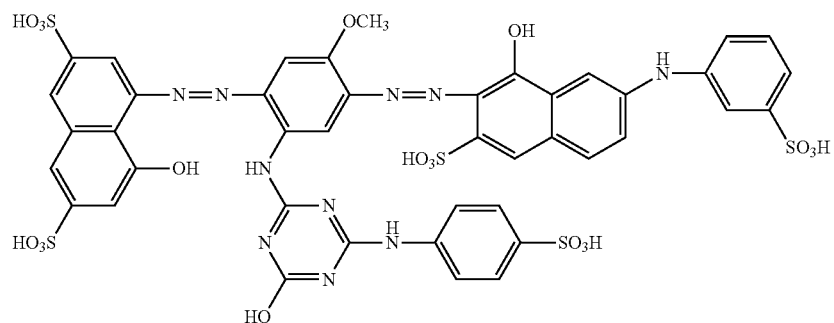
(29)
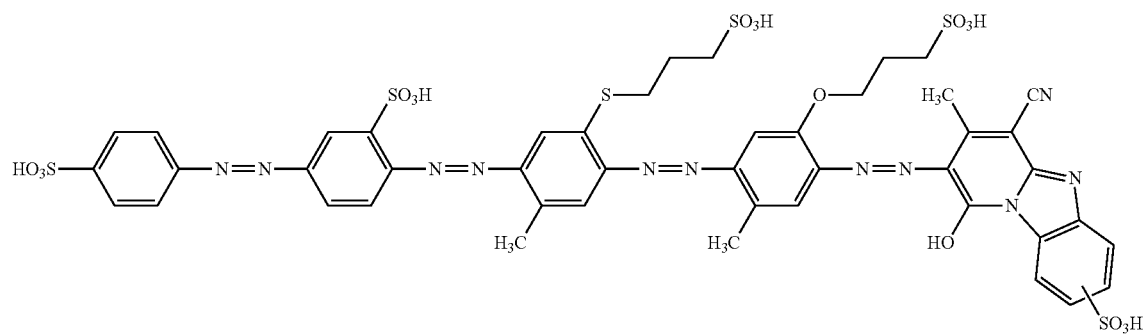
(30)

-continued

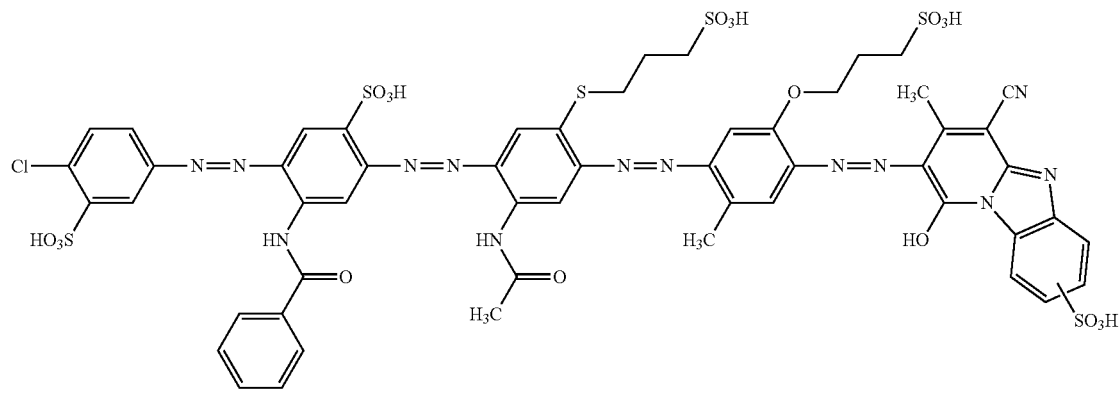

(31)

Preparation of Inks

After the respective components (unit: %) shown in upper parts of Tables 5-1 and 5-2 were mixed and sufficiently stirred, the resultant respective mixtures were filtered under pressure through a filter having a pore size of 0.20 μm, thereby preparing respective inks. Incidentally, "Acetylenol E100" in Tables 5-1 and 5-2 is a trade name of a nonionic surfactant (product of Kawaken Fine Chemicals Co., Ltd.) In addition, the lower parts of Tables 5-1 and 5-2 show the molar ratio of the content of a lithium ion to the content of the compound represented by the general formula (I) in each ink as "molar ratio (times) of lithium ion." Further, the lower parts of Tables 5-1 and 5-2 show the proportion of the anionic groups of a lithium salt form to the anionic groups of the compound represented by the general formula (I) as "ratio (%) of lithium salt." It should be noted that it was performed at the time of the preparation of each ink that a proper amount of lithium acetate was added so that the molar ratio (times) of the lithium ion took a value shown in the lower parts of Tables 5-1 and 5-2, and then ion-exchanged water was removed proportionately.

TABLE 5-1

Compositions and characteristics of inks

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Compound A (Na salt: 100.0%) | 2.50 | | | | | | | | | | | | |
| Compound B (Na salt: 100.0%) | | 2.50 | | | | | | | | | | | |
| Compound C (Li salt: 60.0%, Na salt: 40.0%) | | | 2.50 | | | | | | | | | | |
| Compound D (Li salt: 70.0%, Na salt: 30.0%) | | | | 2.50 | | | | | | | | | |
| Compound E (Li salt: 80.0%, Na salt: 20.0%) | | | | | 2.50 | 2.50 | | | 2.50 | 2.50 | 2.50 | 1.25 | 1.25 |
| Compound F (Li salt: 90.0%, Na salt: 10.0%) | | | | | | | 2.50 | | | | | | |
| Compound G (Li salt: 100.0%) | | | | | | | | 2.50 | | | | | |
| Compound H (Na salt: 100.0%) | | | | | | | | | 0.50 | | | 0.50 | 0.50 |
| Compound I (Na salt: 100.0%) | | | | | | | | | | 0.35 | | 0.35 | |
| C.I. Direct Violet 107 (Na salt: 100.0%) | | | | | | | | | | | 0.35 | | 0.35 |
| Comparative compound A (Li salt: 80.0%, Na salt: 20.0%) | | | | | | | | | | | | | |
| Comparative compound B (Li salt: 80.0%, Na salt: 20.0%) | | | | | | | | | | | | | |
| Comparative compound C (Li salt: 80.0%, Na salt: 20.0%) | | | | | | | | | | | | | |
| Comparative compound D (Li salt: 80.0%, Na salt: 20.0%) | | | | | | | | | | | | | |
| Comparative compound E (Li salt: 80.0%, Na salt: 20.0%) | | | | | | | | | | | | | |
| Ethylene glycol | 4.00 | 4.00 | 4.00 | 4.00 | 4.00 | 4.00 | 4.00 | 4.00 | 4.00 | 4.00 | 4.00 | 4.00 | 4.00 |
| Diethylene glycol | 4.00 | 4.00 | 4.00 | 4.00 | 4.00 | 4.00 | 4.00 | 4.00 | 4.00 | 4.00 | 4.00 | 4.00 | 4.00 |
| 1,5-Pentanediol | 4.00 | 4.00 | 4.00 | 4.00 | 4.00 | 4.00 | 4.00 | 4.00 | 4.00 | 4.00 | 4.00 | 4.00 | 4.00 |
| Bis(2-hydroxyethyl)sulfone | 4.00 | 4.00 | 4.00 | 4.00 | 4.00 | 4.00 | 4.00 | 4.00 | 4.00 | 4.00 | 4.00 | 4.00 | 4.00 |
| 2-Pyrrolidone | 4.00 | 4.00 | 4.00 | 4.00 | 4.00 | 4.00 | 4.00 | 4.00 | 4.00 | 4.00 | 4.00 | 4.00 | 4.00 |
| Acetylenol E100 | 1.00 | 1.00 | 1.00 | 1.00 | 1.00 | 1.00 | 1.00 | 1.00 | 1.00 | 1.00 | 1.00 | 1.00 | 1.00 |
| Ion-exchanged water | 76.50 | 76.50 | 76.50 | 76.50 | 76.50 | 76.50 | 76.50 | 76.50 | 76.00 | 76.15 | 76.15 | 76.90 | 76.90 |
| Molar ratio (times) of lithium ion | 3.5 | 3.5 | 3.5 | 3.5 | 4.0 | 30.0 | 4.5 | 5.0 | 30.0 | 30.0 | 30.0 | 30.0 | 30.0 |
| Proportion (%) of lithium salt | 0.0 | 0.0 | 60.0 | 70.0 | 80.0 | 80.0 | 90.0 | 100.0 | 80.0 | 80.0 | 80.0 | 80.0 | 80.0 |

TABLE 5-2

Compositions and characteristics of inks

| | Comparative Examples | | | | | |
|---|---|---|---|---|---|---|
| | 1 | 2 | 3 | 4 | 5 | 6 |
| Compound A (Na salt: 100.0%) | | | | | | |
| Compound B (Na salt: 100.0%) | 2.50 | | | | | |
| Compound C (Li salt: 60.0%, Na salt: 40.0%) | | | | | | |
| Compound D (Li salt: 70.0%, Na salt: 30.0%) | | | | | | |
| Compound E (Li salt: 80.0%, Na salt: 20.0%) | | | | | | |
| Compound F (Li salt: 90.0%, Na salt: 10.0%) | | | | | | |
| Compound G (Li salt: 100.0%) | | | | | | |
| Compound H (Na salt: 100.0%) | | | | | | |
| Compound I (Na salt: 100.0%) | | | | | | |
| C.I. Direct Violet 107 (Na salt: 100.0%) | | | | | | |
| Comparative compound A (Li salt: 80.0%, Na salt: 20.0%) | | 2.50 | | | | |
| Comparative compound B (Li salt: 80.0%, Na salt: 20.0%) | | | 2.50 | | | |
| Comparative compound C (Li salt: 80.0%, Na salt: 20.0%) | | | | 2.50 | | |
| Comparative compound D (Li salt: 80.0%, Na salt: 20.0%) | | | | | 2.50 | |
| Comparative compound E (Li salt: 80.0%, Na salt: 20.0%) | | | | | | 2.50 |
| Ethylene glycol | 4.00 | 4.00 | 4.00 | 4.00 | 4.00 | 4.00 |
| Diethylene glycol | 4.00 | 4.00 | 4.00 | 4.00 | 4.00 | 4.00 |
| 1,5-Pentanediol | 4.00 | 4.00 | 4.00 | 4.00 | 4.00 | 4.00 |
| Bis(2-hydroxyethyl)sulfone | 4.00 | 4.00 | 4.00 | 4.00 | 4.00 | 4.00 |
| 2-Pyrrolidone | 4.00 | 4.00 | 4.00 | 4.00 | 4.00 | 4.00 |
| Acetylenol E100 | 1.00 | 1.00 | 1.00 | 1.00 | 1.00 | 1.00 |
| Ion-exchanged water | 76.50 | 76.50 | 76.50 | 76.50 | 76.50 | 76.50 |
| Molar ratio (times) of lithium ion | 30.0 | 30.0 | 30.0 | 30.0 | 30.0 | 30.0 |
| Proportion (%) of lithium salt | 0.0 | 80.0 | 80.0 | 80.0 | 80.0 | 80.0 |

Evaluation

Each of the inks obtained above was charged into an ink cartridge, and the ink cartridge was installed in an ink jet recording apparatus (trade name "PIXUS Pro 9000 Mark II", manufactured by Canon Inc.) in which an ink is ejected from a recording head by the action of thermal energy. In this embodiment, a solid image recorded by applying 22 ng of an ink to a unit region of 1/600 inch×1/600 inch is defined as "recording duty of 100%".

A recorded product was produced by recording a solid image having a recording duty of 50% on a recording medium (trade name "Canon Photo Paper-Gloss Gold GL-101," manufactured by Canon Inc.) with an ink jet recording apparatus in an environment of a temperature of 23° C. and a relative humidity of 55%. The resultant recorded product was left in the environment of a temperature of 23° C. and a relative humidity of 55% for 24 hours and then sufficiently dried, followed by the respective evaluations. A spectrophotometer (trade name "Spectrolino," manufactured by Gretag Macbeth) was used in the evaluations. The evaluations were performed by measuring an L*, a*, and b* in an L*a*b* colorimetric system specified by the International Commission on Illumination (CIE) with the spectrophotometer under the conditions of a light source of D50 and a field of view of 2°. With regard to the evaluation criteria of the following respective items in the present invention, a criterion C was defined as an unacceptable level, and criteria A and B were defined as acceptable levels. Table 6 shows the results of the evaluations.

(Ozone Resistance)

The $L_1$, $a_1$, and $b_1$ of the solid image in the recorded product obtained in the foregoing were measured (Lab values before an ozone resistance test). The recorded product was mounted in an ozone test apparatus (trade name "OMS-H," manufactured by Suga Test Instruments Co., Ltd.) and then exposed to ozone for 2 cycles defined as follows: 8 hours of mounting under the conditions of a temperature in the tank of 23° C., a relative humidity of 50%, and an ozone gas concentration of 10 ppm was defined as 1 cycle. After that, the $L_2$, $a_2$, and $b_2$ of the solid image in the recorded product were measured (Lab values after the ozone resistance test). A color difference $\Delta E=\{(L_1-L_2)^2+(a_1-a_2)^2+(b_1-b_2)^2\}^{1/2}$ was calculated from the Lab values before the ozone resistance test and the Lab values after the ozone resistance test thus obtained, and then an evaluation for ozone resistance was performed according to the following evaluation criteria.

A: The ΔE was less than 6.5.
B: The ΔE was 6.5 or more and less than 8.0.
C: The ΔE was 8.0 or more.

(Humidity Resistance)

The $L_1$, $a_1$, and $b_1$ of the solid image in the recorded product obtained in the foregoing were measured (Lab values before a humidity resistance test). The recorded product was placed in a thermostatic chamber set to a temperature of 30° C. and a relative humidity of 90% for 1 week. After that, the $L_2$, $a_2$, and $b_2$ of the solid image in the recorded product were measured (Lab values after the humidity resistance test). A color difference $\Delta E=\{(L_1-L_2)^2+(a_1-a_2)^2+(b_1-b_2)^2\}^{1/2}$ was calculated from the Lab values before the humidity resistance test and the Lab values after the humidity resistance test thus obtained, and then an evaluation for humidity resistance was performed according to the following evaluation criteria. A smaller ΔE means that the blurring and color change of the image are less liable to occur even in a high-humidity environment.

A: The ΔE was less than 1.5.
B: The ΔE was 1.5 or more and less than 2.6.
C: The ΔE was 2.6 or more.

(Color Rendering Properties of Light Sources)

The $L_1$, $a_1$, and $b_1$ of the solid image in the recorded product obtained in the foregoing were measured (Lab values in the light source D50). In addition, the light source was changed to each of D65, A, C, and F1 to F12 (a total of 14 kinds), and then the $L_2$, $a_2$, and $b_2$ of the solid image in the recorded product were similarly measured (Lab values in each light source). Then, the shift of the Lab values in each of the 14 kinds of light sources based on the Lab values in the case where the light source was D50 was calculated as a color difference $\Delta E=\{(L_1-L_2)^2+(a_1-a_2)^2+(b_1-b_2)^2\}^{1/2}$. Then, an evaluation for color rendering properties of light sources was performed based on the maximum of the respective ΔE's obtained in those 14 kinds of light sources according to the following evaluation criteria. A smaller maximum of the ΔE's showing the color differences due to the light sources means that the extent to which the color of the image changes when different light sources are used becomes smaller.

A: The maximum of the ΔE's was less than 5.5.
B: The maximum of the ΔE's was 5.5 or more and less than 6.5.
C: The maximum of the ΔE's was 6.5 or more.

TABLE 6

|  |  | Results of evaluations | | |
|---|---|---|---|---|
|  |  | Ozone resistance | Humidity resistance | Color rendering properties of light sources |
| Examples | 1 | B | B | A |
|  | 2 | B | B | A |
|  | 3 | B | B | A |
|  | 4 | B | A | A |
|  | 5 | B | A | A |
|  | 6 | B | A | A |
|  | 7 | B | A | A |
|  | 8 | B | A | B |
|  | 9 | A | A | A |
|  | 10 | A | A | A |
|  | 11 | A | A | A |
|  | 12 | A | A | A |
|  | 13 | A | A | A |
| Comparative Examples | 1 | B | C | A |
|  | 2 | C | B | C |
|  | 3 | C | A | C |
|  | 4 | C | C | C |
|  | 5 | C | A | C |
|  | 6 | C | A | C |

It should be noted that the ozone resistance of each of the images recorded with the inks of Examples 12 and 13 was more excellent than the ozone resistance of each of the images recorded with the inks of the other examples similarly evaluated as "A," and a reduction in color balance of each of the images due to an ozone gas was suppressed at a particularly high level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-136343, filed Jun. 15, 2012, which is hereby incorporated by reference herein in its entirety.

What is claimed is:

1. An ink comprising a coloring material and a lithium ion, wherein;
the coloring material comprises a compound represented by the following general formula (I); and
a content of the lithium ion in the ink is 3.5 times or more in terms of molar ratio with respect to a content of the compound represented by the general formula (I):

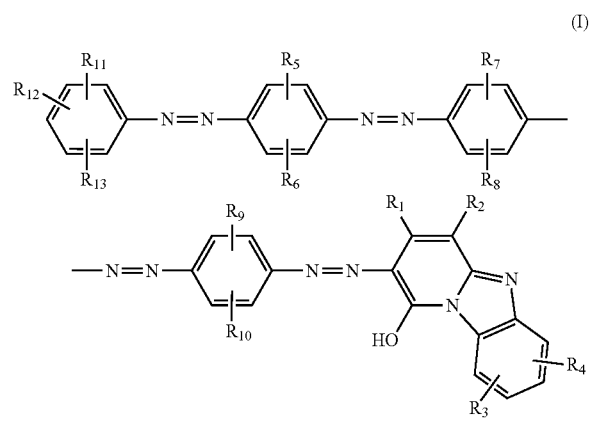

(I)

in the general formula (I),
$R_1$ represents an alkyl group having 1 to 4 carbon atoms; an alkyl group having 1 to 4 carbon atoms and being substituted with a carboxy group; a phenyl group; a phenyl group substituted with a sulfonic group; or a carboxy group,
$R_2$ represents a cyano group; a carbamoyl group; or a carboxy group,
$R_3$ and $R_4$ each independently represent a hydrogen atom; an alkyl group having 1 to 4 carbon atoms; a halogen atom; an alkoxy group having 1 to 4 carbon atoms; or a sulfonic group,
$R_5$ and $R_7$ each independently represent an alkylthio group having 1 to 4 carbon atoms; or an alkylthio group having 1 to 4 carbon atoms and being substituted with at least one kind of group selected from the group consisting of a hydroxy group, a sulfonic group, and a carboxy group,
$R_6$ and $R_8$ each independently represent an alkylcarbonylamino group having 1 to 4 carbon atoms,
$R_9$ and $R_{10}$ each independently represent a hydrogen atom; a carboxy group; a sulfonic group; an acetylamino group; a halogen atom; an alkyl group having 1 to 4 carbon atoms; an alkoxy group having 1 to 4 carbon atoms; or an alkoxy group having 1 to 4 carbon atoms and being substituted with at least one kind of group selected from the group consisting of a hydroxy group, an alkoxy group having 1 to 4 carbon atoms, a sulfonic group, and a carboxy group, and
$R_{11}$, $R_{12}$, and $R_{13}$ each independently represent a hydrogen atom; a carboxy group; a sulfonic group; a hydroxy group; an acetylamino group; a halogen atom; a cyano group; a nitro group; a sulfamoyl group; an alkyl group having 1 to 4 carbon atoms; an alkoxy group having 1 to 4 carbon atoms; an alkoxy group having 1 to 4 carbon atoms and being substituted with at least one kind of group selected from the group consisting of a hydroxy group, an alkoxy group having 1 to 4 carbon atoms; a sulfonic group, and a carboxy group; an alkylsulfonyl group having 1 to 4 carbon atoms; or an alkylsulfonyl group having 1 to 4 carbon atoms and being substituted with at least one kind of group selected from the group consisting of a hydroxy group, a sulfonic group, and a carboxy group.

2. An ink according to claim 1, wherein in the general formula (I), $R_1$ represents a methyl group, $R_2$ represents a cyano group or a carbamoyl group, $R_3$ represents a hydrogen atom, a methyl group, or a methoxy group, $R_4$ represents a sulfonic group, $R_5$ and $R_7$ each independently represent a sulfoalkylthio group having 1 to 4 carbon atoms, $R_6$ and $R_8$ each independently represent an alkylcarbonylamino group having 1 to 4 carbon atoms, $R_9$ represents a sulfoalkoxy group having 1 to 4 carbon atoms, $R_{10}$ represents an alkyl group having 1 to 4 carbon atoms or an acetylamino group, and $R_{11}$, $R_{12}$, and $R_{13}$ each independently represent a hydrogen atom, a carboxy group, a sulfonic group, a halogen atom, a nitro group, a methyl group, a methoxy group, or a sulfamoyl group.

3. An ink according to claim 1, wherein in the general formula (I), $R_1$ represents a methyl group, $R_2$ represents a cyano group, $R_3$ represents a hydrogen atom or a methoxy group, $R_4$ represents a sulfonic group, $R_5$ and $R_7$ each independently represent a sulfoalkylthio group having 1 to carbon atoms, $R_6$ and $R_8$ each represent an acetylamino group, $R_9$ represents a sulfopropoxy group or a sulfobutoxy group, $R_{10}$ represents an alkyl group having 1 to 4 carbon atoms, $R_{11}$ represents a hydrogen atom or a sulfonic group, $R_{12}$ represents a sulfonic group or a halogen atom, and $R_{13}$ represents a hydrogen atom or a sulfonic group.

4. An ink according to claim 1, wherein the compound represented by the general formula (I) has anionic groups; and
a proportion of anionic groups of a lithium salt form to the anionic groups is 70.0% or more.

5. An ink according to claim 1, wherein the compound represented by the general formula (I) has anionic groups; and
a proportion of anionic groups of a lithium salt form to the anionic groups is 90.0% or less.

6. An ink according to claim 1, further comprising at least one compound selected from the group consisting of a compound represented by the following general formula (VI) and a compound represented by the following general formula (VII):

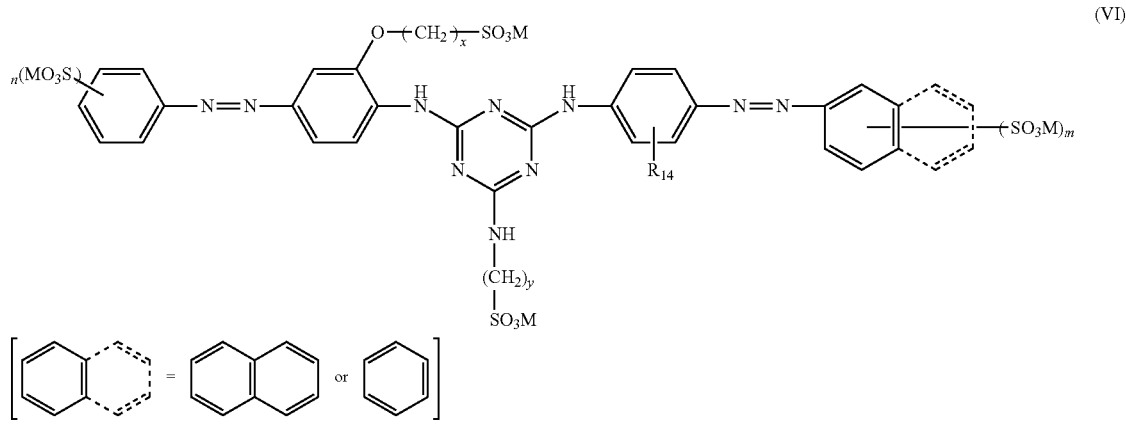

(VI)

in the general formula (VI), $R_{14}$ represents a hydrogen atom, an alkyl group having 1 to 4 carbon atoms, an alkoxy group having 1 to 4 carbon atoms, or a sulfonic group, n represents an integer of 1 or 2, m represents an integer of 1 to 3, x represents an integer of 2 to 4, y represents an integer of 1 to 3, and M's each independently represent a hydrogen atom, an alkali metal, ammonium, or an organic ammonium;

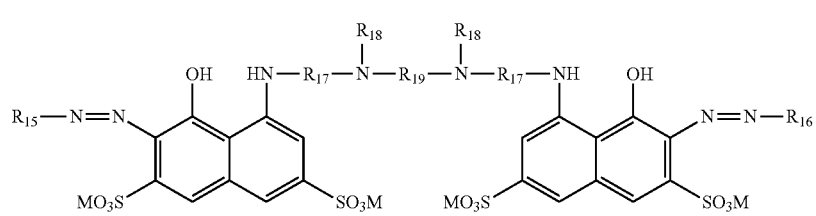

(VII)

in the general formula (VII), $R_{15}$ and $R_{16}$ each independently represent an aryl group, and at least one of $R_{15}$ and $R_{16}$ has at least one kind of substituent selected from the group consisting of a carboxy group and a sulfonic group, $R_{17}$'s each independently represent 1,3,5-triazine or a derivative thereof, $R_{18}$'s each independently represent a hydrogen atom, a substituted or unsubstituted alkyl group, a substituted or unsubstituted alkenyl group, a substituted or unsubstituted aralkyl group, or an atomic group that forms a perhydroxyazine ring together with a nitrogen atom, $R_{19}$ represents a divalent organic linking group, and M's each independently represent a hydrogen atom, an alkali metal, ammonium, or an organic ammonium.

7. An ink cartridge comprising an ink and an ink storage portion storing the ink, wherein the ink comprises the ink according to claim 1.

8. An ink jet recording method comprising ejecting an ink from a recording head of an ink jet system to record an image on a recording medium, wherein the ink comprises the ink according to claim 1.

* * * * *